(12) United States Patent
Araki et al.

(10) Patent No.: US 8,924,051 B2
(45) Date of Patent: Dec. 30, 2014

(54) DRIVE DEVICE FOR RAILWAY VEHICLE

(75) Inventors: Daijiro Araki, Hitachinaka (JP); Motomi Shimada, Mito (JP); Shuichi Tachihara, Hitachinaka (JP); Akira Horie, Tokyo (JP); Masahiro Nagasu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 161 days.

(21) Appl. No.: 13/701,053

(22) PCT Filed: May 31, 2011

(86) PCT No.: PCT/JP2011/062454
§ 371 (c)(1),
(2), (4) Date: Nov. 30, 2012

(87) PCT Pub. No.: WO2011/152383
PCT Pub. Date: Dec. 8, 2011

(65) Prior Publication Data
US 2013/0073125 A1    Mar. 21, 2013

(30) Foreign Application Priority Data
Jun. 1, 2010    (JP) ................... 2010-125440

(51) Int. Cl.
| | |
|---|---|
| B61C 17/12 | (2006.01) |
| B60L 9/22 | (2006.01) |
| B60L 7/14 | (2006.01) |
| B60L 7/16 | (2006.01) |
| B60L 11/00 | (2006.01) |
| B60L 15/20 | (2006.01) |

(52) U.S. Cl.
CPC ... *B60L 9/22* (2013.01); *B60L 7/14* (2013.01); *B60L 7/16* (2013.01); *B60L 11/005* (2013.01); *B60L 15/2009* (2013.01); *Y02T 10/7022* (2013.01); *B60L 2240/12* (2013.01); *B60L 2240/547* (2013.01); *B60L 2240/68* (2013.01); *Y02T 90/16* (2013.01); *Y02T 90/161* (2013.01)
USPC ............ 701/19; 318/376; 318/500; 318/800; 318/802; 303/114.1

(58) Field of Classification Search
USPC ................... 701/19; 318/376, 500, 800, 802; 303/114.1
See application file for complete search history.

(56) References Cited

U.S. PATENT DOCUMENTS

| | | | | |
|---|---|---|---|---|
| 5,714,851 | A | * | 2/1998 | Antony et al. ................ 318/148 |
| 6,612,245 | B2 | * | 9/2003 | Kumar et al. .............. 105/26.05 |

(Continued)

FOREIGN PATENT DOCUMENTS

| | | |
|---|---|---|
| JP | 2005-278269 | 10/2005 |
| JP | 2006-94613 | 4/2006 |

(Continued)

*Primary Examiner* — Mary Cheung
*Assistant Examiner* — Michael Berns
(74) *Attorney, Agent, or Firm* — Antonelli, Terry, Stout & Kraus, LLP

(57) ABSTRACT

A control device for a railway vehicle controls an inverter device based on a direct-current link voltage Vfc between the opposite terminals of a filter capacitor. A direct-current voltage applied to the inverter device during regeneration is the sum of a voltage Vb of power storage equipment and an overhead wire voltage Vs, so that only detecting the direct-current link voltage Vfc is not enough to separate the voltage Vb of the power storage equipment and the overhead wire voltage Vs from each other. The power storage equipment can be connected in series with the inverter device, and a voltage sensor that detects the overhead wire voltage Vs is provided between a current collector device and a grounding point. The power storage equipment is controlled based on the detection result from the voltage sensor.

18 Claims, 18 Drawing Sheets

(56) References Cited

U.S. PATENT DOCUMENTS

| | | | |
|---|---|---|---|
| 6,615,118 B2 * | 9/2003 | Kumar | 701/19 |
| 7,185,591 B2 * | 3/2007 | Kumar et al. | 105/35 |
| 7,532,960 B2 * | 5/2009 | Kumar | 701/19 |
| 7,673,948 B2 * | 3/2010 | Otomo | 303/114.1 |
| 7,965,056 B2 * | 6/2011 | Terunuma et al. | 318/800 |
| 2002/0174798 A1 * | 11/2002 | Kumar | 105/50 |
| 2003/0222502 A1 * | 12/2003 | Takahashi et al. | 307/18 |
| 2006/0005736 A1 * | 1/2006 | Kumar | 105/1.4 |
| 2006/0005738 A1 * | 1/2006 | Kumar | 105/35 |
| 2006/0005739 A1 * | 1/2006 | Kumar | 105/35 |
| 2006/0066146 A1 * | 3/2006 | Otomo | 303/151 |
| 2008/0266920 A1 * | 10/2008 | Terunuma et al. | 363/124 |
| 2010/0070117 A1 * | 3/2010 | Siffert | 701/19 |
| 2013/0063055 A1 * | 3/2013 | Araki et al. | 318/376 |

FOREIGN PATENT DOCUMENTS

| | | |
|---|---|---|
| JP | 2008-228359 | 9/2008 |
| JP | 2008-228451 | 9/2008 |
| JP | 2009-183078 | 8/2009 |
| JP | 2009-183079 | 8/2009 |

* cited by examiner

DRIVE DEVICE FOR RAILWAY VEHICLE

The present application is the U.S. National Phase of International Application No. PCT/JP2011/062454, filed on May 31, 2011, which claims the benefit of Japanese Patent Application No. 2010-125440, filed Jun. 1, 2010, the entire contents of which are hereby incorporated by reference.

TECHNICAL FIELD

The present invention relates to a drive device for a railway vehicle on which power storage means is mounted.

BACKGROUND ART

In the field of railway vehicles, regenerative brake control is widely used in which the main motor is made to operate as a generator during braking to produce a braking force and at the same time convert the kinetic energy of the vehicle to electrical energy and the electrical energy is fed back to the overhead wire. The electric power fed back to the overhead wire in the regenerative brake control can be used for power running of other vehicles, so that the power consumption can be reduced.

However, the regenerative brake control has two problems described below.

One problem is that, in the high speed range (equal to or higher than the constant torque terminal velocity), the regeneration capability is limited depending on the capabilities of the main motor and the inverter device, and a satisfactory braking force cannot be achieved.

The power of the main motor is determined by the voltage applied to the main motor and the current flowing to the main motor. In general, the voltage is determined by the power supply voltage supplied through the overhead wire, so that the current has to be increased in order to increase the power of the main motor. However, if the current increases, the heat generated by the motor and the inverter device also increases, so that the body of the main motor has to be enlarged to ensure sufficient cooling capacity, or the cooler of the inverter device has to be upsized. Furthermore, the number of semiconductor elements arranged in parallel in the inverter device may have to be increased. That is, the approach to increase the regenerative braking force in the high speed range by increasing the current flowing to the main motor involves increasing the size of the device and therefore the weight of the device, and thus is less effective to reduce the power consumption.

The other problem is that, in a situation where there are a small number of other power-running vehicles, the regenerative braking force has to be reduced in order to reduce the increase of the overhead wire voltage to protect the inverter device.

When there are a small number of other power-running vehicles, the power fed back to the overhead wire from the regenerative brake is not consumed, and therefore, the overhead wire voltage increases (this state will be referred to as a state of light load regeneration, hereinafter). As a result, the voltage applied to the inverter device can exceed the allowable value and damage the inverter device. To avoid this, the regenerative braking force has to be reduced to reduce the increase of the overhead wire voltage. As a result, the braking force becomes insufficient, and the shortage of the braking force has to be supplemented by the air brake, so that the power consumption cannot be sufficiently effectively reduced.

A technique for solving these problems is described in Patent Literature 1, for example. A drive device for a railway vehicle described in Patent Literature 1 comprises a motor, an inverter device that drives the motor, and a power storage device capable of charging and discharging and has a switch to selectively connect the power storage device in series with the inverter device (referred to as a serial type, hereinafter) or in parallel with the inverter device (referred to as a parallel type, hereinafter). The drive device further has a chopper circuit to cause charging and discharging of the power storage device. This configuration is intended to solve the problems 1 and 2 described above.

To address the problem 1 of the shortage of the regenerative braking force in the high speed range, the switch is operated to connect the inverter device and the power storage device in series with each other, thereby boosting the input voltage of the inverter device by the voltage of the power storage device. This can increase the voltage applied to the motor and thus the power of the motor, thereby increasing the regenerative braking force in the high speed range without increasing the current supplied to the motor (a high speed range electric brake function).

To address the problem 2 of the state of light load regeneration, the switch is operated to connect the inverter device and the power storage device in parallel with each other to activate the chopper circuit, thereby making the power storage device absorb part of the regenerated power (a regenerative energy absorption function).

In power running, the switch can be operated to connect the inverter device and the power storage device in parallel with each other to activate the chopper circuit, thereby causing the power storage device to discharge and supplying the electric power to the inverter device.

CITATION LIST

Patent Literature

Patent Literature 1: Japanese Patent Laid-Open Publication No. 2009-183078

SUMMARY OF INVENTION

Technical Problem

As described in Patent literature 1 described above, in general, a control device for a railway vehicle controls an inverter device 4 based on a direct-current link voltage Vfc between the opposite terminals of a filter capacitor 3. In a circuit configuration according to FIG. 1 in the Patent literature 1, a direct-current voltage applied to the inverter device 4 during regeneration is the sum of a voltage Vb of power storage equipment 6 and an overhead wire voltage Vs as described later, so that only detecting the direct-current link voltage Vfc is not enough to separate the voltage Vb of the power storage equipment 6 and the overhead wire voltage Vs from each other, and it cannot be determined whether the current state is the state of light load regeneration or not. When it is determined that the current state is the state of light load regeneration, the regenerative braking force is reduced to prevent an increase of the overhead wire voltage and protect the inverter device. Therefore, there is a problem that the energy saving effect decreases if it is determined that the current state is the state of light load regeneration when the current state is not actually the state of light load regeneration.

Solution to Problem

Thus, in the circuit configuration in which the power storage equipment can be connected in series with the inverter device 4, a voltage sensor that detects the overhead wire voltage Vs is provided between a current collector device 1 and a grounding point, and the power storage equipment is controlled based on the detection result from the voltage sensor.

Advantageous Effect of Invention

According to the present invention, the voltage sensor that detects the overhead wire voltage is provided, and the power storage equipment is controlled based on the overhead wire voltage, so that the energy saving effect in the railway vehicle can be improved.

DESCRIPTION OF EMBODIMENTS

In the following, embodiments of the present invention will be described with reference to the drawings.

First Embodiment

Figure 1:
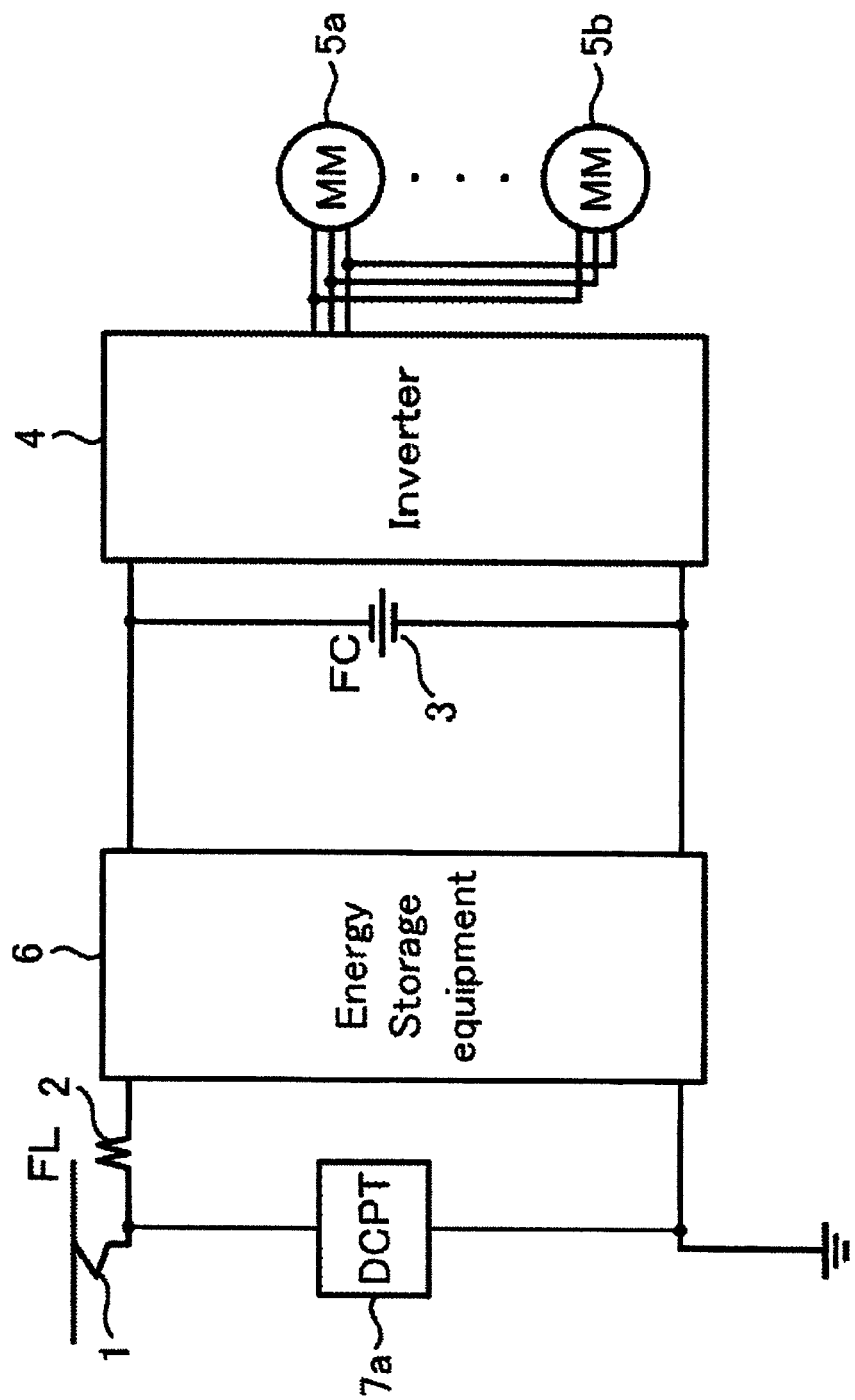
FIG. 1 is a diagram showing a basic configuration of a drive device for a railway vehicle according to a first embodiment of the present invention.

FIG. 1 is a diagram showing a basic configuration of a drive device for a railway vehicle according to a first embodiment of the present invention.

The drive device for a railway vehicle comprises a current collector device 1 that receives a direct-current power from a direct-current voltage source, an LC circuit (filter circuit) formed by a filter reactor (FL) 2 and a filter capacitor (FC) 3, an inverter device 4 that converts the direct-current power to an alternating-current power, one or more main motors 5a to 5b driven by the inverter device 4, and power storage equipment 6 (formed by a power storage device, such as a storage battery and a capacitor, and a buck-boost chopper, for example) capable of charging and discharging on the direct-current power side of the inverter device 4, and a voltage sensor (DCPT) 7a that detects a voltage Vs supplied from the current collector device 1 (referred to as an overhead wire voltage, hereinafter) is provided between the current collector device 1 and a grounding point. Although this drawing shows a case where the inverter device 4 drives two main motors, the number of main motors driven by the inverter device 4 is not particularly limited according to the present invention.

In general, a control device for a railway vehicle controls the inverter device 4 based on a direct-current link voltage Vfc between the opposite terminals of the filter capacitor 3. However, in the circuit configuration according to the present invention, the direct-current voltage applied to the inverter device 4 during regeneration is the sum of a voltage Vb of the power storage equipment 6 and an overhead wire voltage Vs as described later, so that only detecting the direct-current link voltage Vfc is not enough to separate the voltage Vb of the power storage equipment 6 and the overhead wire voltage Vs from each other, and it cannot be determined whether the current state is a state of light load regeneration or not. When it is determined that the current state is the state of light load regeneration, the regenerative braking force is reduced to prevent an increase of the overhead wire voltage and protect the inverter device. Therefore, if it is determined that the current state is the state of light load regeneration when the current state is not actually the state of light load regeneration, the energy saving effect decreases.

Thus, in the circuit configuration in which the direct-current voltage applied to the inverter device 4 is the sum of the voltage Vb of the power storage equipment 6 and the overhead wire voltage Vs, such as the circuit configuration according to the present invention, it is preferred that the voltage sensor (DCPT) 7a that detects the overhead wire voltage Vs is provided between the current collector device 1 and the grounding point as shown in FIG. 1, whether the current state is the state of light load regeneration or not is determined based on the overhead wire voltage Vs, and the inverter device 4 and the power storage equipment 6 are controlled in accordance with the result of the determination.

According to this embodiment of the present invention, since the power storage equipment 6 is used, both a high speed range electric brake function and a regenerative energy absorption function can be provided. In addition, since the voltage sensor (DCPT) 7a that detects the overhead wire voltage Vs is provided, and whether the current state is the state of light load regeneration or not is properly determined based on the overhead wire voltage Vs, the energy saving effect in the railway vehicle can be improved.

Second Embodiment

Figure 2:
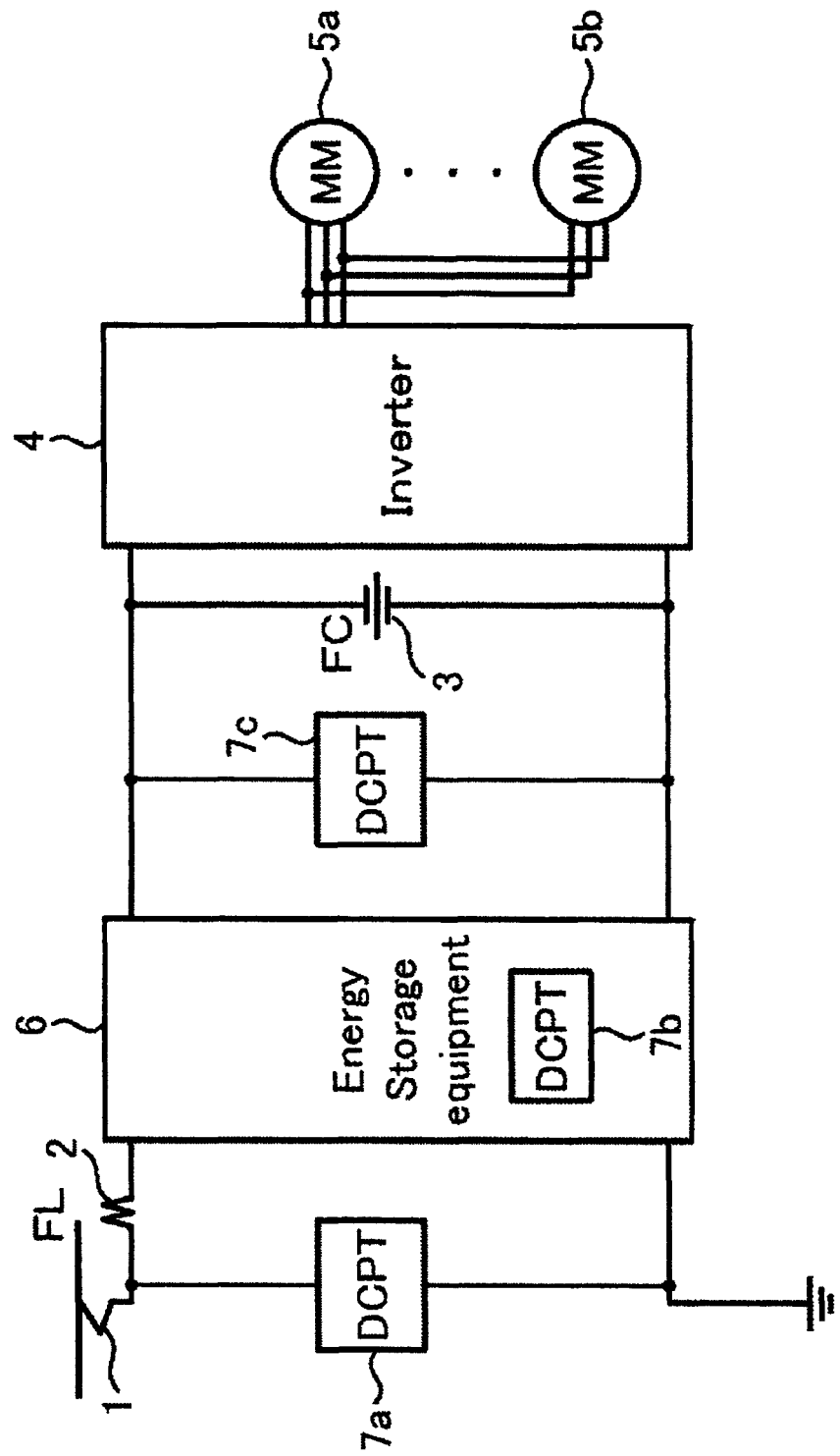
FIG. 2 is a diagram showing a basic configuration of a drive device for a railway vehicle according to a second embodiment of the present invention.

FIG. 2 is a diagram showing a basic configuration of a drive device for a railway vehicle according to a second embodiment of the present invention.

The drive device for a railway vehicle comprises a current collector device 1 that receives a direct-current power from a direct-current voltage source, an LC circuit (filter circuit) formed by a filter reactor (FL) 2 and a filter capacitor (FC) 3, an inverter device 4 that converts the direct-current power to an alternating-current power, one or more main motors 5a to 5b driven by the inverter device 4, and power storage equipment 6 (formed by a power storage device, such as a storage battery and a capacitor, and a buck-boost chopper, for example) capable of charging and discharging on the direct-current power side of the inverter device 4, and at least two of a voltage sensor (DCPT) 7a that detects an overhead wire voltage Vs, a voltage sensor (DCPT) 7b that detects a voltage Vb of the power storage equipment 6 and a voltage sensor (DCPT) 7c that detects a direct-current link voltage Vfc between the opposite terminals of the filter capacitor 3 are provided. Although this drawing shows a case where the inverter device 4 drives two main motors, the number of main motors driven by the inverter device 4 is not particularly limited according to the present invention.

In general, a control device for a railway vehicle controls the inverter device 4 based on the direct-current link voltage Vfc between the opposite terminals of the filter capacitor 3. However, in the circuit configuration according to the present invention, the direct-current voltage applied to the inverter device 4 during regeneration is the sum of the voltage Vb of the power storage equipment 6 and the overhead wire voltage Vs as described later, so that only detecting the direct-current link voltage Vfc is not enough to separate the voltage Vb of the power storage equipment 6 and the overhead wire voltage Vs from each other, and it cannot be determined whether the current state is a state of light load regeneration or not.

Thus, in view of the fact that the direct-current link voltage Vfc between the opposite terminals of the filter capacitor 3 is the sum of the overhead wire voltage Vs and the voltage Vb of the power storage equipment 6, it is preferred that at least two of the voltage sensor (DCPT) 7a that detects the overhead wire voltage Vs, the voltage sensor (DCPT) 7b that detects the voltage Vb of the power storage equipment 6 and the voltage sensor (DCPT) 7c that detects the direct-current link voltage Vfc between the opposite terminals of the filter capacitor 3 are provided, a voltage equivalent to the overhead wire voltage Vs is calculated from at least two voltage values of the direct-current link voltage Vfc between the opposite terminals of the filter capacitor 3, the voltage Vb of the power storage equipment 6 and the overhead wire voltage Vs, whether the current state is the state of light load regeneration or not is determined based on the overhead wire voltage Vs, and the inverter device 4 and the power storage equipment 6 are controlled in accordance with the result of the determination.

According to this embodiment of the present invention, since the power storage equipment 6 is used, both a high speed range electric brake function and a regenerative energy absorption function can be provided. In addition, since the voltage equivalent to the overhead wire voltage Vs is calculated from at least two voltage values of the overhead wire voltage Vs detected by the voltage sensor (DCPT) 7a, the voltage Vb of the power storage equipment 6 detected by the voltage sensor (DCPT) 7b and the direct-current link voltage Vfc between the opposite terminals of the filter capacitor 3 detected by the voltage sensor (DCPT) 7c, and whether the current state is the state of light load regeneration or not is properly determined based on the overhead wire voltage Vs, the energy saving effect in the railway vehicle can be improved.

Third Embodiment

Figure 3:
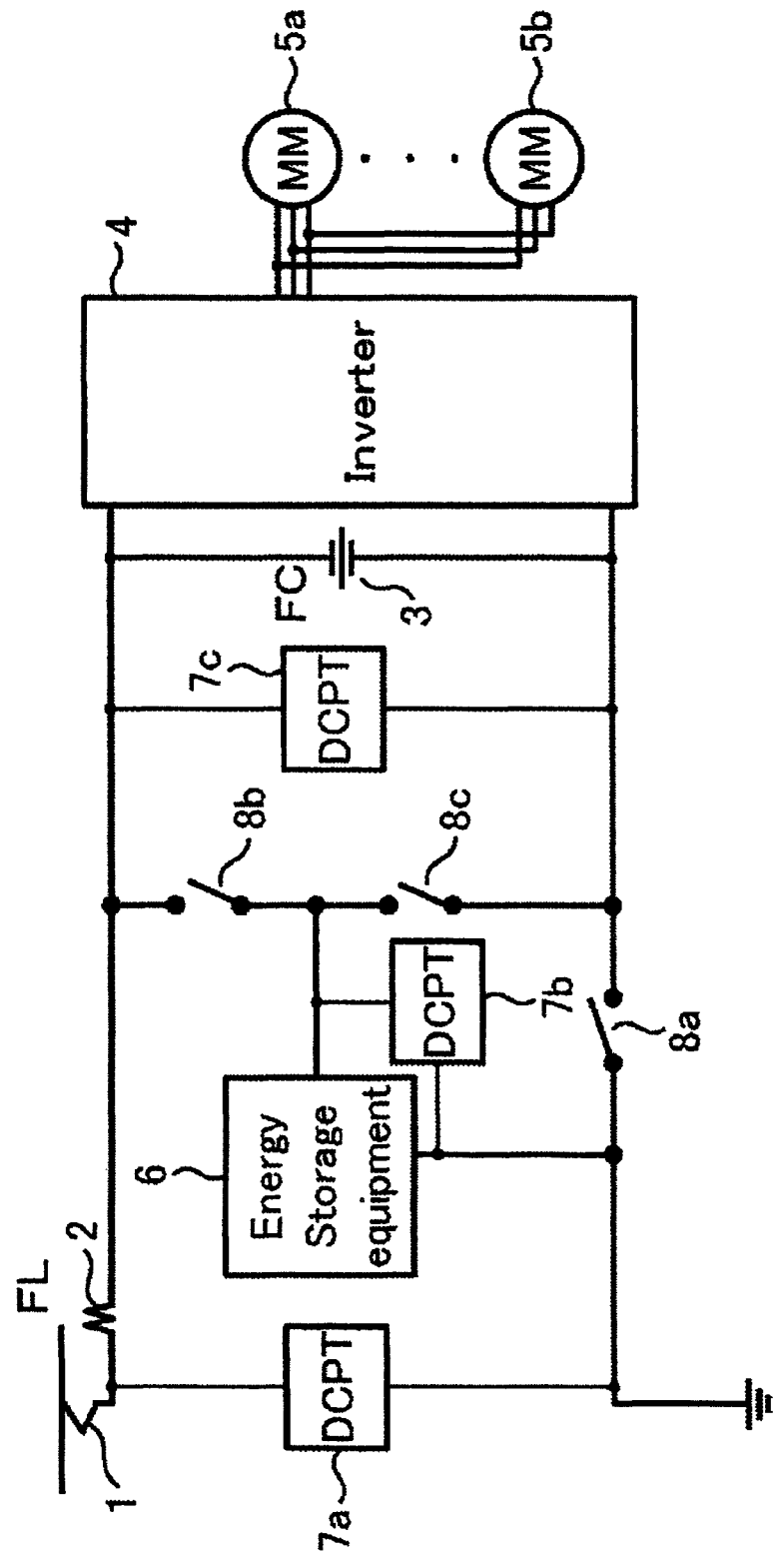
FIG. 3 is a diagram showing a basic configuration of a drive device for a railway vehicle according to a third embodiment of the present invention.

FIG. 3 is a diagram showing a basic configuration of a drive device for a railway vehicle according to a third embodiment of the present invention.

The drive device for a railway vehicle comprises a current collector device 1 that receives a direct-current power from a direct-current voltage source, an LC circuit (filter circuit) formed by a filter reactor (FL) 2 and a filter capacitor (FC) 3, an inverter device 4 that converts the direct-current power to an alternating-current power, one or more main motors 5a to 5b driven by the inverter device 4, and power storage equipment 6 (formed by a power storage device, such as a storage battery and a capacitor, and a buck-boost chopper, for example) capable of charging and discharging on the direct-current power side of the inverter device 4, and is characterized in that at least two of a voltage sensor (DCPT) 7a that detects an overhead wire voltage Vs, a voltage sensor (DCPT) 7b that detects a voltage Vb of the power storage equipment 6 and a voltage sensor (DCPT) 7c that detects a direct-current link voltage Vfc between the opposite terminals of the filter capacitor 3 are provided, and the power storage equipment 6 can be connected in series with the inverter device 4 by turning off switches 8a and 8b and turning on a switch 8c or connected in parallel with the inverter device 4 by turning off the switch 8c and turning on the switches 8a and 8b so that both a high speed range electric brake function and a regenerative energy absorption function can be provided at the same time. Although this drawing shows a case where the inverter device 4 drives two main motors, the number of main motors driven by the inverter device 4 is not particularly limited according to the present invention.

In general, a control device for a railway vehicle controls the inverter device 4 based on the direct-current link voltage Vfc between the opposite terminals of the filter capacitor 3. However, in the case of the circuit configuration according to the present invention, the direct-current voltage applied to the inverter device 4 during regeneration is the sum of the voltage Vb of the power storage equipment 6 and the overhead wire voltage Vs as described later, so that only detecting the direct-current link voltage Vfc is not enough to separate the voltage Vb of the power storage equipment 6 and the overhead wire voltage Vs from each other, and it cannot be determined whether the current state is a state of light load regeneration or not.

Thus, in the circuit configuration in which the direct-current voltage applied to the inverter device 4 is the sum of the voltage Vb of the power storage equipment 6 and the overhead wire voltage Vs, such as the circuit configuration according to the present invention, it is preferred that the voltage sensor (DCPT) 7a that detects the overhead wire voltage Vs supplied from the current collector device 1 is provided between the current collector device 1 and a grounding point, whether the current state is the state of light load regeneration or not is determined based on the overhead wire voltage Vs, and the inverter device 4 and the power storage equipment 6 are controlled in accordance with the result of the determination.

Alternatively, in view of the fact that the direct-current link voltage Vfc between the opposite terminals of the filter capacitor 3 is the sum of the overhead wire voltage Vs and the voltage Vb of the power storage equipment 6, it is preferred that at least two of the voltage sensor (DCPT) 7a that detects the overhead wire voltage Vs, the voltage sensor (DCPT) 7b that detects the voltage Vb of the power storage equipment 6 and the voltage sensor (DCPT) 7c that detects the direct-current link voltage Vfc between the opposite terminals of the filter capacitor 3 are provided, a voltage equivalent to the overhead wire voltage Vs is calculated from at least two voltage values of the direct-current link voltage Vfc between the opposite terminals of the filter capacitor 3, the voltage Vb of the power storage equipment 6 and the overhead wire voltage Vs, whether the current state is the state of light load regeneration or not is determined based on the overhead wire voltage Vs, and the inverter device 4 and the power storage equipment 6 are controlled in accordance with the result of the determination.

Although the circuit shown in FIG. 3 is configured to switch between the high speed range electric brake function and the regenerative energy absorption function by switching the main circuit configuration between the serial type and the parallel type, any circuit configuration that can provide the high speed range electric brake function and the regenerative energy absorption function at the same time can be used.

According to this embodiment of the present invention, since the power storage equipment 6 is used, both the high speed range electric brake function and the regenerative energy absorption function can be provided. In addition, since the voltage equivalent to the overhead wire voltage Vs is calculated from at least two voltage values of the overhead wire voltage Vs detected by the voltage sensor (DCPT) 7a, the voltage Vb of the power storage equipment 6 detected by the voltage sensor (DCPT) 7b and the direct-current link voltage Vfc between the opposite terminals of the filter capacitor 3 detected by the voltage sensor (DCPT) 7c, and whether the current state is the state of light load regeneration or not is properly determined based on the overhead wire voltage Vs, the energy saving effect in the railway vehicle can be improved.

Fourth Embodiment

Figure 4:
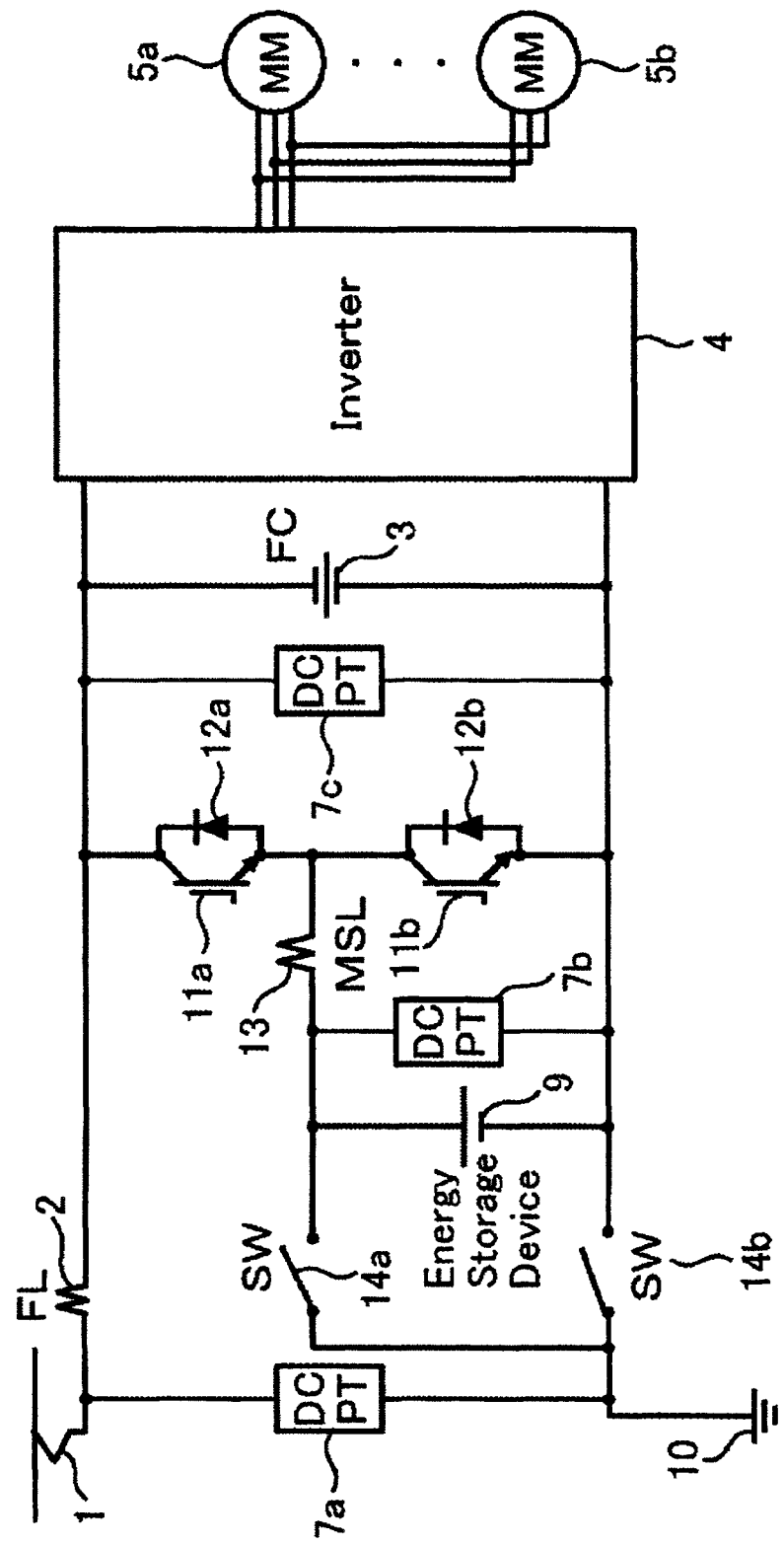
FIG. 4 is a diagram showing a basic configuration of a drive device for a railway vehicle according to a fourth embodiment of the present invention.

FIG. 4 is a diagram showing a basic configuration of a drive device for a railway vehicle according to a fourth embodiment of the present invention.

A direct-current power supplied from a current collector device 1 is input to an inverter device 4 after a fluctuation in a high frequency range is removed by an LC circuit (filter circuit) formed by a filter reactor (FL) 2 and a filter capacitor (FC) 3. The inverter device 4 converts the input direct-current power to a variable voltage variable frequency (VVVF) three-phase alternating-current power and drives main motors 5a and 5b. Although this drawing shows a case where the inverter device 4 drives two main motors, the number of main motors driven by the inverter device 4 is not particularly limited according to the present invention.

A grounding point 10 determines a reference potential for this circuit.

Switching elements 11a and 11b are current blocking means constituted by a semiconductor element. The switching elements 11a and 11b are connected in parallel with diode elements 12a and 12b oriented in the opposite direction to the direction of conduction, respectively, at input and output terminals thereof.

A first smoothing reactor (MSL) 13 is inserted in a power line connecting the point of connection of the switching elements 11a and 11b and a positive terminal of a power storage device 9. A negative terminal of the power storage device 9 is connected to a low potential-side terminal of the inverter device 4.

A switch 14a is disposed between the grounding point 10 and the positive terminal of the power storage device 9, and a switch 14b is disposed between the grounding point 10 and the negative terminal of the power storage device 9. The switches 14a and 14b are capable of conducting and blocking currents flowing in both directions and may be a circuit breaker having a mechanical contact or a combination of semiconductor-based current blocking means and a diode element.

In general, a control device for a railway vehicle controls the inverter device 4 based on a direct-current link voltage Vfc between the opposite terminals of the filter capacitor 3. However, in the case of the circuit configuration according to the present invention, the direct-current voltage applied to the inverter device 4 during regeneration is the sum of a terminal-to-terminal voltage Vb of the power storage device 9 and an overhead wire voltage Vs as described later, so that only detecting the direct-current link voltage Vfc is not enough to separate the terminal-to-terminal voltage Vb of the power storage device 9 and the overhead wire voltage Vs from each other, and it cannot be determined whether the current state is a state of light load regeneration or not.

Thus, in the circuit configuration in which the direct-current voltage applied to the inverter device 4 is the sum of the terminal-to-terminal voltage Vb of the power storage device 9 and the overhead wire voltage Vs, such as the circuit configuration according to the present invention, it is preferred that a voltage sensor (DCPT) 7a that detects the overhead wire voltage Vs supplied from the current collector device 1 is provided between the current collector device 1 and the grounding point 10, and whether the current state is the state of light load regeneration or not is determined based on the overhead wire voltage Vs.

Alternatively, in view of the fact that the direct-current link voltage Vfc between the opposite terminals of the filter capacitor 3 is the sum of the overhead wire voltage Vs and the terminal-to-terminal voltage Vb of the power storage device 9, it is preferred that at least two of the voltage sensor (DCPT) 7a that detects the overhead wire voltage Vs, a voltage sensor (DCPT) 7b that detects the terminal-to-terminal voltage Vb of the power storage device 9 and a voltage sensor (DCPT) 7c that detects the direct-current link voltage Vfc between the opposite terminals of the filter capacitor 3 are provided, a voltage equivalent to the overhead wire voltage Vs is calculated from at least two voltage values of the direct-current link voltage Vfc between the opposite terminals of the filter capacitor 3, the terminal-to-terminal voltage Vb of the power storage device 9 and the overhead wire voltage Vs, and whether the current state is the state of light load regeneration or not is determined based on the overhead wire voltage Vs.

In the case of the circuit configuration according to the present invention, when it is determined based on the values Vfc, Vb and Vs that the current state is the state of light load regeneration, the inverter device 4 and the switching elements 11*a* and 11*b* are controlled to serve a regenerative energy absorption function.

A circuit operation during power running according to this embodiment will be described. In the case of the circuit configuration according to the present invention, the electric power of the power storage device 9 is charged during regeneration as described later, so that the power storage device 9 needs to be discharged as much as possible during power running as a preparation for the subsequent regeneration. In the case of the circuit configuration according to the present invention, the power storage device 9 can be discharged during power running in the following two methods (a parallel type and a serial type).

A first method will be described. According to the first method, the switch 14*a* is turned off, and the switch 14*b* is turned on. As a result, the grounding point-side terminal of the inverter device 4 and the negative side of the power storage device 9 are connected to the grounding point 10. Then, the voltage applied to the inverter device 4 approximately agrees with the voltage Vs supplied from the current collector device 1, and the inverter device 4 and the power storage device 9 are connected in parallel with each other.

The power storage device 9 can be discharged to supply an electric power to the inverter device 4 by cyclically turning on and off the switching element 11*b*. The first smoothing reactor 13 has a function of controlling the rate of change of the current flowing to the power storage device 9 below a predetermined value.

If the switching element 11*b* is turned on for a predetermined time Ton_b, the positive side and the negative side of the power storage device 9 are short-circuited, while the first smoothing reactor 13 controls the rate of increase of the current below a prescribed value and at the same time stores an amount of electric power energy equal to the time integration of the product of the current conducted in the period of Ton_b and the terminal-to-terminal voltage of the power storage device 9. Then, if the switching element 11*b* is turned off for a predetermined time Toff_b, the electric power energy stored in the first smoothing reactor 13 is discharged through the diode element 12*a* to a direct-current power part between the current collector device 1 and the inverter device 4.

According to this method, even in an emergency where power supply through the overhead wire fails because of a failure in the overhead wire (such as a pantograph contact loss and an overhead wire power failure), the vehicle can run on the power from the power storage device 9.

However, from the viewpoint of achieving a reduction of the amount of power running electric power by using the electric power of the power storage device 9 to supplement the whole or a part of the power running electric power, the amount of supplementary electric power decreases by the amount equivalent to the switching loss of the switching elements, and the energy saving effect decreases.

Next, a second method will be described. According to the second method, the switch 14*a* is turned on, and the switch 14*b* is turned off. As a result, the grounding point-side terminal of the inverter device 4 and the positive side of the power storage device 9 are connected to the grounding point 10, and the inverter device 4 and the power storage device 9 are connected in series with each other.

In this case, the power storage device 9 discharges an amount of electric power equal to the product of the terminal-to-terminal voltage Vb of the power storage device 9 and a power storage device conduction current Ib (=an overhead wire current Is), Vb×Ib. The discharging by turning on and off of the switching element 11*b* described above does not occur, so that no switching loss occurs. Therefore, compared with the method that involves discharging by turning on and off of the switching element 11*b* described above, the power running electric power can be efficiently supplemented by the power storage device 9.

Next, a circuit operation during regeneration will be described. In regeneration, the switch 14*a* is turned on, and the switch 14*b* is turned off. As a result, the voltage at the low potential-side terminal of the inverter device 4 decreases by the terminal-to-terminal voltage Vb of the power storage device 9 on the assumption that the grounding point 10 is a reference. On the other hand, the potential at the high potential-side terminal of the inverter device 4 is equal to the overhead wire voltage Vs on the assumption that the potential at the grounding point 10 is a reference potential. That is, the potential difference between the input terminal and the output terminal (between the positive terminal and the negative terminal) of the inverter device 4 is the sum of the terminal-to-terminal voltage Vb of the power storage device 9 and the overhead wire voltage Vs, Vb+Vs. In this way, a maximum regenerated power can be increased by (Vb+Vs)/Vs without changing a maximum conduction current of the inverter device 4 by increasing the potential difference between the input terminal and the output terminal (between the positive terminal and the negative terminal) of the inverter device 4 by the terminal-to-terminal voltage Vb of the power storage device 9. Meanwhile, the power storage device 9 is charged with an amount of electric power equal to the product of the terminal-to-terminal voltage Vb and the power storage device conduction current Ib (=the overhead wire current Is), Vb×Ib.

If the state of light load regeneration occurs, the main circuit configuration (serial type) is maintained, and the switching element 11*a* is cyclically turned on and off in accordance with the overhead voltage calculated from the values from the voltage sensors 7*a* to 7*c*, thereby charging the power storage device 9 with the regenerated electric power that has failed to be fed back to the overhead wire. The first smoothing reactor 13 has a function of controlling the rate of change of the current flowing to the power storage device 9 below a predetermined value.

If the switching element 11*a* is turned on for a predetermined time Ton_a, a current flows from a direct-current power part toward the power storage device 9 when the direct-current link voltage. Vfc between the opposite terminals of the filter capacitor 3 described above is higher than the terminal-to-terminal voltage Vb of the power storage device 9. Meanwhile, the first smoothing reactor 13 controls the rate of increase of the current below a prescribed value and at the same time stores an amount of electric power energy equal to the time integration of the product of the current conducted in the period of Ton_a and the terminal-to-terminal voltage of the power storage device 9. Then, if the switching element 11*a* is turned off for a predetermined time Toff_a, a circuit is formed in which the electric power energy stored in the first smoothing reactor 13 is passed through the power storage device 9 from the high potential-side terminal to the low potential-side terminal and then returns to the first smoothing reactor 13 through the diode element 12*b* of the switching element 11b. That is, the power storage device 9 is continuously charged with the electric power energy stored in the first smoothing reactor 13 for the predetermined time Toff_a when the switching element 11a is in the off state, and the charging current attenuates as the electric power energy is discharged from the first smoothing reactor 13. In this way, the power storage device 9 is charged with an amount of electric power equal to the product of the terminal-to-terminal voltage Vb and the power storage device conduction current Ib (=the overhead wire current Is), Vb×Ib.

According to this embodiment of the present invention, the serial circuit configuration allows efficient supplement to the power running electric power by the power storage device 9 during power running, and a high speed range electric brake function and a regenerative energy absorption function can be provided at the same time without changing the main circuit configuration during regeneration. In regeneration, the high speed range electric brake function performs the primary operation, and when the state of light load regeneration occurs, the regenerative energy absorption function is seamlessly activated. Thus, the energy saving effect can be maximized.

According to the prior art described earlier, the high speed range electric brake function and the regenerative energy absorption function are provided by changing the main circuit configuration by turning on and off the switches, so that the input voltage of the inverter device abruptly changes by the voltage of the power storage device when the switching occurs. When the input voltage of the inverter device jumps, an overvoltage protection function can be activated, and the torque of a motor can abruptly change to make passengers of the vehicle feel uncomfortable.

Thus, if the state of light load regeneration occurs when the inverter device and the power storage device are connected in series with each other to serve the high speed range electric brake function during regeneration, the inverter device needs to be stopped once before the switches are turned on and off so as to connect the inverter device and the power storage device in parallel with each other. As a result, there has been a problem that the continuous regeneration operation cannot be achieved, and the braking force can temporarily decrease to increase the braking distance, or an air brake has to be activated to supplement the shortage of the braking force, which leads to a decrease of the energy saving effect.

During power running, the circuit configuration is the parallel configuration, in which the voltage of the power storage device is boosted to the overhead wire voltage by a chopper circuit, thereby supplying the electric power stored in the power storage device to the inverter device. However, a loss occurs because of the operation of the switching elements of the chopper circuit. Therefore, the method according to the prior art has a problem that the amount of electric power supplied to the inverter device decreases by the loss due to the operation of the switching elements, and the energy saving effect decreases accordingly.

The circuit configurations described in the fourth to seventh embodiments can provide at least one of efficient supply of a power running electric power from the power storage device during power running and reduction of a change of the input voltage of the inverter device when switching between the high speed range electric brake operation and the regenerative energy absorption operation occurs during regeneration.

Fifth Embodiment

Figure 5:
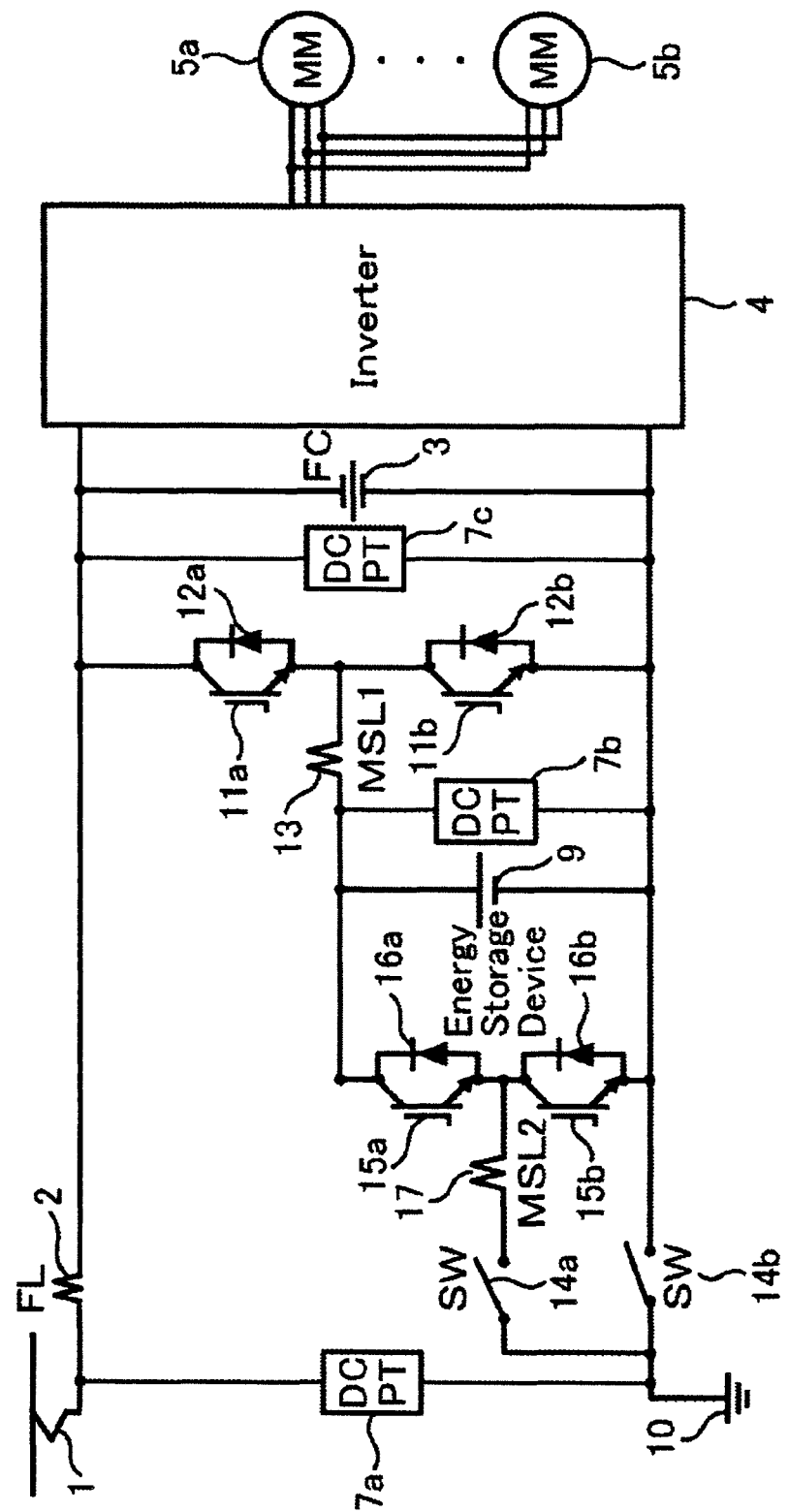
FIG. 5 is a diagram showing a first basic configuration of a drive device for a railway vehicle according to a fifth embodiment of the present invention.

FIG. 5 is a diagram showing a basic configuration of a drive device for a railway vehicle according to a fifth embodiment of the present invention.

The basic configuration according to the fifth embodiment differs from the basic configuration according to the fourth embodiment (FIG. 4) in that (1) switching elements 15a and 15b are connected between the positive side and the negative side of a power storage device 9, and the switching elements 15a and 15b are connected in parallel with diode elements 16a and 16b oriented in the opposite direction to the direction of conduction, respectively, at input and output terminals thereof, and (2) a switch 14a is connected to the point of connection of the switching elements 15a and 15b via a second smoothing reactor 17.

The switching elements 15a and 15b, the diode elements 16a and 16b and the second smoothing reactor 17 form a step-down chopper circuit that uses the power storage device 9 as a power supply.

In the basic configuration according to the fourth embodiment (FIG. 4), the sum of the voltage of a direct-current voltage source and the voltage of the power storage device 9 is input to the inverter device 4 in regeneration. However, since the voltage of the power storage device 9 changes depending on the amount of charges stored therein, the voltage of the power storage device 9 changes with time depending on the state of charging or discharging. Typically, the voltage on the direct-current side of the inverter device 4 is preferably constant.

Thus, according to this embodiment, a step-down chopper circuit that uses the power storage device 9 as a power supply is formed to control the voltage applied to an inverter device 4 by the power storage device 9 to be constant, thereby eliminating the change of the voltage of the direct-current voltage source and making the voltage constant.

Figure 6:
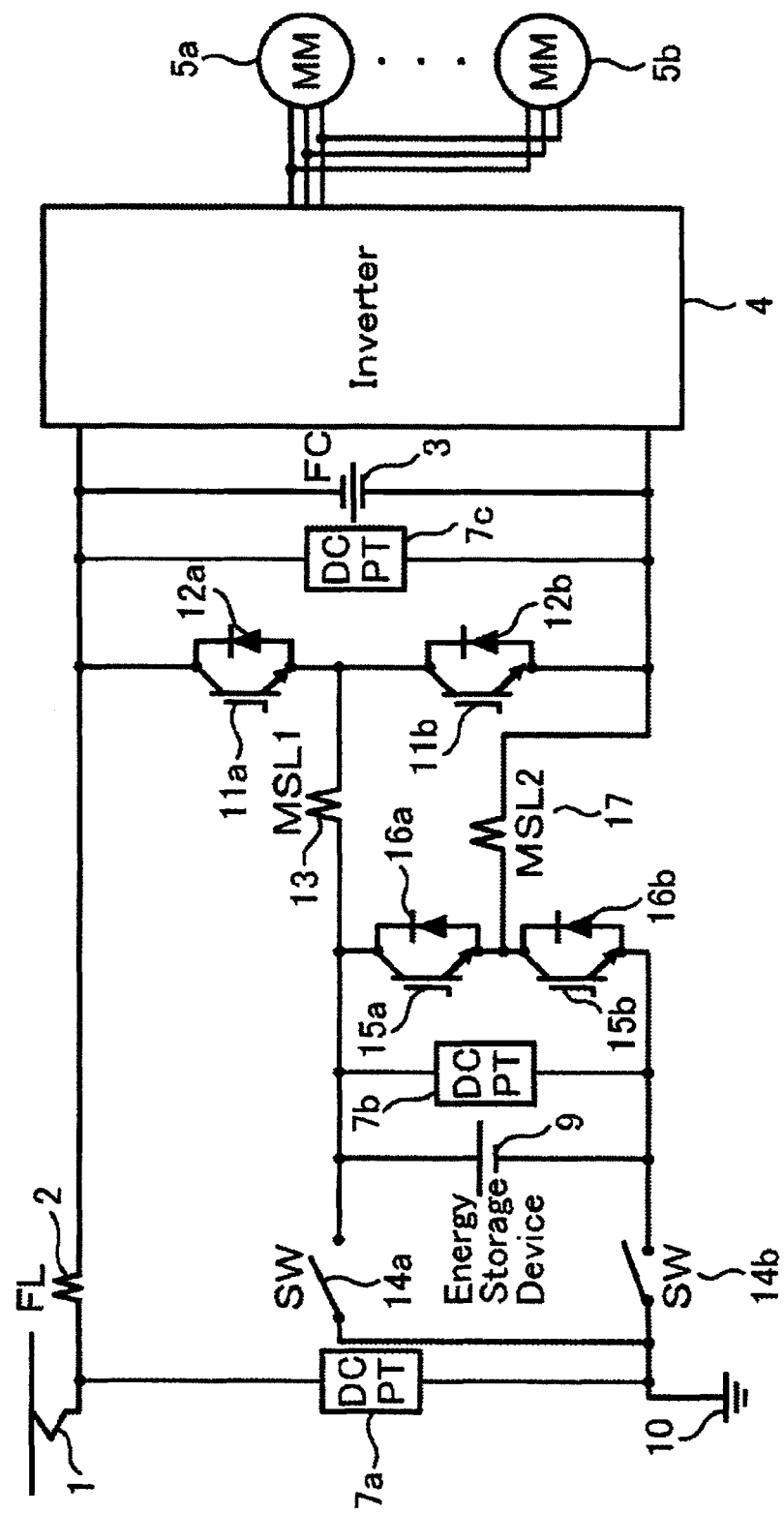
FIG. 6 is a diagram showing a second basic configuration of the drive device for a railway vehicle according to the fifth embodiment of the present invention.

Although the step-down chopper circuit formed by the switching elements 15a and 15b, the diode elements 16a and 16b and the second smoothing reactor 17 is disposed on the side of a grounding point 10 of the power storage device 9 according to this embodiment, the step-down chopper circuit may be disposed on the side of the inverter device 4 of the power storage device 9 as shown in FIG. 6.

A direct-current power supplied from a current collector device 1 is input to the inverter device 4 after a fluctuation in a high frequency range is removed by an LC circuit (filter circuit) formed by a filter reactor (FL) 2 and a filter capacitor (FC) 3. The inverter device 4 converts the input direct-current power to a variable voltage variable frequency (VVVF) three-phase alternating-current power and drives main motors 5a and 5b. Although this drawing shows a case where the inverter device 4 drives two main motors, the number of main motors driven by the inverter device 4 is not particularly limited according to the present invention.

The grounding point 10 determines a reference potential for this circuit.

Switching elements 11a and 11b are current blocking means constituted by a semiconductor element. The switching elements 11a and 11b are connected in parallel with diode elements 12a and 12b oriented in the opposite direction to the direction of conduction, respectively, at input and output terminals thereof.

A first smoothing reactor (MSL) 13 is inserted in a power line connecting the point of connection of the switching elements 11a and 11b and a positive terminal of a power storage device 9. A negative terminal of the power storage device 9 is connected to a low potential-side terminal of the inverter device 4.

The switching elements 15a and 15b are current blocking means constituted by a semiconductor element. The switching elements 15a and 15b are connected in parallel with the diode elements 16a and 16b oriented in the opposite direction to the direction of conduction, respectively, at input and output terminals thereof.

The second smoothing reactor (MSL) 17 is inserted in a power line between the point of connection of the switching elements 15a and 15.b and the switch 14a.

The switching elements 15a and 15b, the diode elements 16a and 16b and the second smoothing reactor (MSL) 17 form a step-down chopper circuit that uses the power storage device 9 as a power supply and control the voltage to continuously vary between zero and the voltage value of the power storage device 9.

The switch 14a is disposed between the grounding point 10 and the positive terminal of the power storage device 9, and the switch 14b is disposed between the grounding point 10 and the negative terminal of the power storage device 9. The switches 14a and 14b are capable of conducting and blocking currents flowing in both directions and may be a circuit breaker having a mechanical contact or a combination of semiconductor-based current blocking means and a diode element.

In general, a control device for a railway vehicle controls the inverter device 4 based on a direct-current link voltage Vfc between the opposite terminals of the filter capacitor 3. However, in the case of the circuit configuration according to the present invention, the direct-current voltage applied to the inverter device 4 during regeneration is the sum of a voltage Vchp of the step-down chopper circuit formed by the switching elements 15a and 15b, the diode elements 16a and 16b and the second smoothing reactor (MSL) 17 and an overhead wire voltage Vs as described later, so that only detecting the direct-current link voltage Vfc is not enough to separate the voltage Vchp of the step-down chopper circuit and the overhead wire voltage Vs from each other, and it cannot be determined whether the current state is a state of light load regeneration or not. In addition, to make the step-down chopper operate to provide a desired voltage, a voltage Vb of the power storage device 9 is needed.

Thus, in the circuit configuration in which the direct-current voltage applied to the inverter device 4 is the sum of the voltage Vchp of the step-down chopper circuit and the overhead wire voltage Vs, such as the circuit configuration according to the present invention, it is preferred that a voltage sensor (DCPT) 7a that detects the overhead wire voltage Vs supplied from the current collector device 1 is provided between the current collector device 1 and the grounding point 10, and whether the current state is the state of light load regeneration or not is determined based on the overhead wire voltage Vs.

Alternatively, in view of the fact that the direct-current link voltage Vfc between the opposite terminals of the filter capacitor 3 is the sum of the overhead wire voltage Vs and the voltage Vchp of the step-down chopper circuit, it is preferred that at least two of the voltage sensor (DCPT) 7a that detects the overhead wire voltage Vs, a voltage sensor (DCPT) 7b that detects a terminal-to-terminal voltage Vb of the power storage device 9 and a voltage sensor (DCPT) 7c that detects the direct-current link voltage Vfc between the opposite terminals of the filter capacitor 3 are provided, a voltage equivalent to the overhead wire voltage Vs is calculated from at least two voltage values of the direct-current link voltage Vfc between the opposite terminals of the filter capacitor 3, the terminal-to-terminal voltage Vb of the power storage device 9 and the overhead wire voltage Vs, and whether the current state is the state of light load regeneration or not is determined based on the overhead wire voltage Vs.

In the case of the circuit configuration according to the present invention, when it is determined based on the values Vfc, Vb and Vs that the current state is the state of light load regeneration, the inverter device 4 and the switching elements 11a and 11b are controlled to serve a regenerative energy absorption function.

A circuit operation during power running according to this embodiment will be described. In the case of the circuit configuration according to the present invention, the power storage device 9 is charged during regeneration as described later, so that the electric power of the power storage device 9 needs to be discharged as much as possible during power running as a preparation for the subsequent regeneration.

In the case of the circuit configuration according to the present invention, the power storage device 9 can be discharged during power running in the following two methods (a parallel type and a serial type).

A first method will be described. According to the first method, the switch 14a is turned off, and the switch 14b is turned on. As a result, the grounding point-side terminal of the inverter device 4 and the negative side of the power storage device 9 are connected to the grounding point 10. Then, the voltage applied to the inverter device 4 approximately agrees with the voltage Vs supplied from the current collector device 1, and the inverter device 4 and the power storage device 9 are connected in parallel with each other.

The power storage device 9 can be discharged to supply an, electric power to the inverter device 4 by cyclically turning on and off the switching element 11b. The first smoothing reactor 13 has a function of controlling the rate of change of the current flowing to the power storage device 9 below a predetermined value.

If the switching element 11b is turned on for a predetermined time Ton_b, the positive side and the negative side of the power storage device 9 are short-circuited, while the first smoothing reactor 13 controls the rate of increase of the current below a prescribed value and at the same time stores an amount of electric power energy equal to the time integration of the product of the current conducted in the period of Ton_b and the terminal-to-terminal voltage of the power storage device 9. Then, if the switching element 11b is turned off for a predetermined time Toff_b, the electric power energy stored in the first smoothing reactor 13 is discharged through the diode element 12a to a direct-current power part between the current collector device 1 and the inverter device 4.

According to this method, even in an emergency where power supply through the overhead wire fails because of a failure in the overhead wire (such as a pantograph contact loss and an overhead wire power failure), the vehicle can run on the power from the power storage device 9.

However, from the viewpoint of achieving a reduction of the amount of power running electric power by using the electric power of the power storage device 9 to supplement a part of the power running electric power, the amount of supplementary electric power decreases by the amount equivalent to the switching loss of the switching elements, and the energy saving effect decreases.

Next, a second method will be described. According to the second method, the switch 14a is turned on, and the switch 14b is turned off. As a result, the grounding point-side terminal of the inverter device 4 and the positive side of the power storage device 9 are connected to the grounding point 10, and the inverter device 4 and the power storage device 9 are connected in series with each other.

In this case, the power storage device 9 discharges an amount of electric power equal to the product of the terminal-to-terminal voltage Vb of the power storage device 9 and a power storage device conduction current Ib (=an overhead wire current Is), Vb×Ib. The discharging by turning on and off of the switching element 11b described above does not occur, so that no switching loss occurs. Therefore, compared with the method that involves discharging by turning on and off of the switching element 11b described above, the power running electric power can be efficiently supplemented by the power storage device 9.

Figure 10:
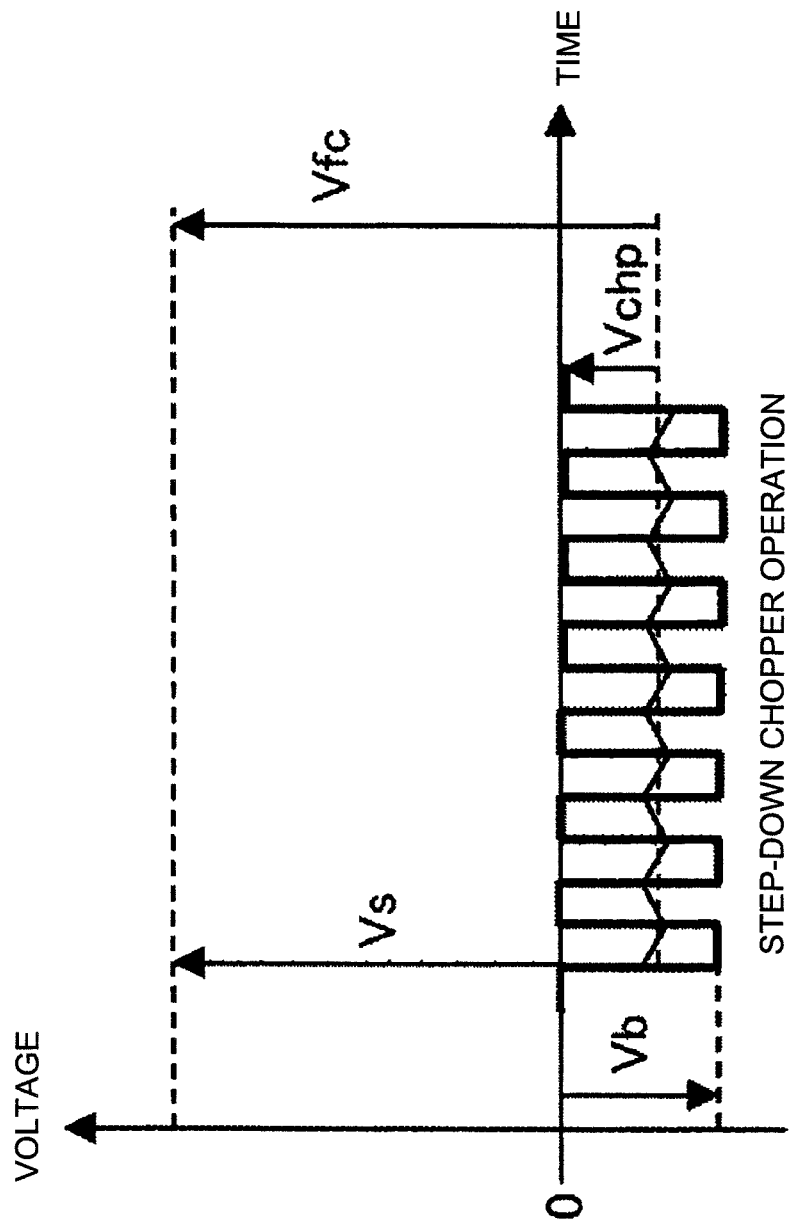
FIG. 10 is a diagram for illustrating a voltage applied to an inverter device in the drive devices for a railway vehicle according to the fifth and seventh embodiments of the present invention.

Next, a circuit operation during regeneration will be described. In regeneration, the switch 14a is turned on, and the switch 14b is turned off. As a result, the voltage at the low potential-side terminal of the inverter device 4 decreases by the voltage Vchp of the step-down chopper circuit on the assumption that the grounding point 10 is a reference as shown in FIG. 10.

On the other hand, the potential at the high potential-side terminal of the inverter device 4 is equal to the overhead wire voltage Vs on the assumption that the potential at the grounding point 10 is a reference potential. That is, the potential difference between the input terminal and the output terminal (between the positive terminal and the negative terminal) of the inverter device 4 is the sum of the overhead wire voltage Vs and the voltage Vchp of the step-down chopper circuit, Vchp+Vs. In this way, a maximum regenerated power can be increased by (Vchp+Vs)/Vs without changing a maximum conduction current of the inverter device 4 by increasing the potential difference between the input terminal and the output terminal (between the positive terminal and the negative terminal) of the inverter device 4 by the terminal-to-terminal voltage Vchp of the power storage device 9. Meanwhile, the power storage device 9 is charged with an amount of electric power equal to the product of the voltage Vchp of the step-down chopper and a current Ichp of the step-down chopper (=the overhead wire current Is), Vchp×Ichp.

If the state of light load regeneration occurs, the main circuit configuration (serial type) is maintained, and the switching element 11a is cyclically turned on and off in accordance with the overhead wire voltage calculated from the values from the voltage sensors 7a to 7c, thereby charging the power storage device 9 with the regenerated electric power that has failed to be fed back to the overhead wire. The first smoothing reactor 13 has a function of controlling the rate of change of the current flowing to the power storage device 9 below a predetermined value.

If the switching element 11a is turned on for a predetermined time Ton_a, a current flows from a direct-current power part toward the power storage device 9 when the direct-current link voltage Vfc between the opposite terminals of the filter capacitor 3 described above is higher than the voltage Vchp of the step-down chopper. Meanwhile, the first smoothing reactor 13 controls the rate of increase of the current below a prescribed value and at the same time stores an amount of electric power energy equal to the time integration of the product of the current conducted in the period of Ton_a and the terminal-to-terminal voltage of the power storage device 9. Then, if the switching element 11a is turned off for a predetermined time Toff_a, a circuit is formed in which the electric power energy stored in the first smoothing reactor 13 is passed through the power storage device 9 from the high potential-side terminal to the low potential-side terminal and then returns to the first smoothing reactor 13 through the diode element 12b of the switching element 11b. That is, the power storage device 9 is continuously charged with the electric power energy stored in the first smoothing reactor 13 for the predetermined time Toff_a when the switching element 11a is in the off state, and the charging current attenuates as the electric power energy is discharged from the first smoothing reactor 13. In this way, the power storage device 9 is charged with an amount of electric power equal to the product of the voltage Vchp of the step-down chopper and the current Ichp of the step-down chopper (=the overhead wire current Is), Vchp×Ichp.

According to this embodiment of the present invention, the serial circuit configuration allows efficient supplement to the power running electric power by the power storage device 9 during power running, and a high speed range electric brake function and a regenerative energy absorption function can be provided at the same time without changing the main circuit configuration during regeneration. In regeneration, the high speed range electric brake function performs the primary operation, and when the state of light load regeneration occurs, the regenerative energy absorption function is seamlessly activated. Thus, the energy saving effect can be maximized.

Sixth Embodiment

Figure 7:
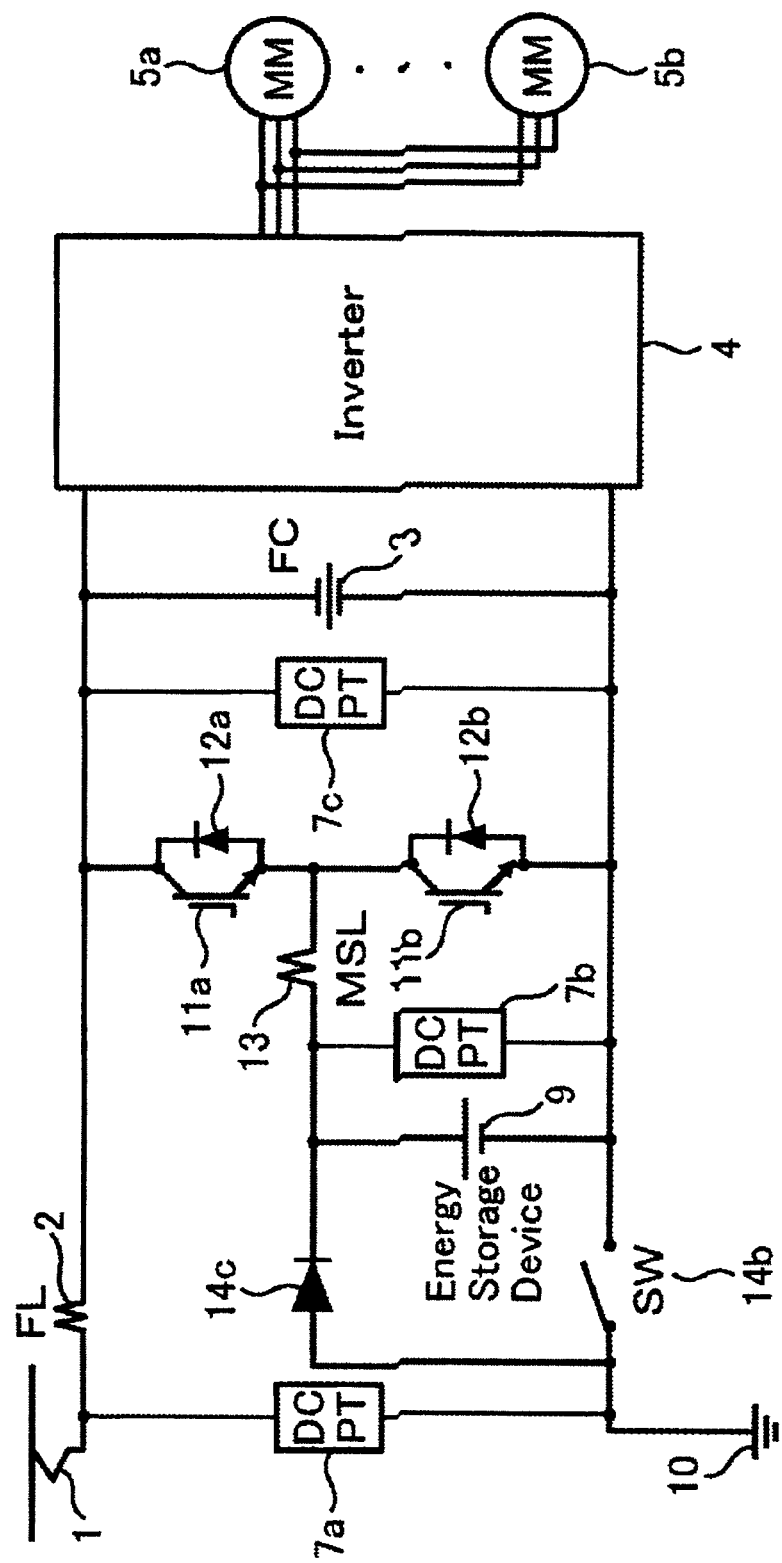
FIG. 7 is a diagram showing a basic configuration of a drive device for a railway vehicle according to a sixth embodiment of the present invention.

FIG. 7 is a diagram showing a basic configuration of a drive device for a railway vehicle according to a sixth embodiment of the present invention.

The basic configuration according to the sixth embodiment differs from the basic configuration according to the fourth embodiment (FIG. 4) in that a switch 14a is replaced with a diode element 14c capable of conducting a current only in the direction from a grounding point 10 to a power storage device 9. As a result, the circuit for turning on and off the switch 14a (not shown in FIG. 4) is not necessary, so that the drive device can be downsized compared with the basic configuration according to the fourth embodiment (FIG. 4), although the power storage device 9 cannot be connected in series with an inverter device 4 during power running as in the basic configuration according to the fourth embodiment (FIG. 4).

In power running, a switch 14b is turned on so that a current flows from the negative side of the power storage device 9 to the grounding point 10. Furthermore, the electric power stored in the power storage device 9 can be supplied to the inverter device 4 by cyclically turning on and off a switching element 11b.

In regeneration, the switch 14b is turned off so that a current flows from the grounding point 10 to the positive side of the power storage device 9 through the diode element 14c. As a result, a high speed range electric brake function and a regenerative energy absorption function can be provided at the same time as in the embodiments described above.

A direct-current power supplied from a current collector device 1 is input to the inverter device 4 after a fluctuation in a high frequency range is removed by an LC circuit (filter circuit) formed by a filter reactor (FL) 2 and a filter capacitor (FC) 3. The inverter device 4 converts the input direct-current power to a variable voltage variable frequency (VVVF) three-phase alternating-current power and drives main motors 5a and 5b. Although this drawing shows a case where the inverter device 4 drives two main motors, the number of main motors driven by the inverter device 4 is not particularly limited according to the present invention.

The grounding point 10 determines a reference potential for this circuit.

Switching elements 11a and 11b are current blocking means constituted by a semiconductor element. The switching elements 11a and 11b are connected in parallel with diode elements 12a and 12b oriented in the opposite direction to the direction of conduction, respectively, at input and output terminals thereof.

A first smoothing reactor (MSL) 13 is inserted in a power line connecting the point of connection of the switching elements 11a and 11b and a positive terminal of the power storage device 9. A negative terminal of the power storage device 9 is connected to a low potential-side terminal of the inverter device 4.

The diode element 14c is disposed between the grounding point 10 and the positive terminal of the power storage device 9 and conducts only a current flowing from the grounding point 10 to the positive side of the power storage device 9.

The switch 14b is disposed between the grounding point 10 and the negative terminal of the power storage device 9. The switch 14b is capable of conducting and blocking currents flowing in both directions and may be a circuit breaker having a mechanical contact or a combination of semiconductor-based current blocking means and a diode element.

In general, a control device for a railway vehicle controls the inverter device 4 based on a direct-current link voltage Vfc between the opposite terminals of the filter capacitor 3. However, in the case of the circuit configuration according to the present invention, the direct-current voltage applied to the inverter device 4 during regeneration is the sum of a terminal-to-terminal voltage Vb of the power storage device 9 and an overhead wire voltage Vs as described later, so that only detecting the direct-current link voltage Vfc is not enough to separate the terminal-to-terminal voltage Vb of the power storage device 9 and the overhead wire voltage Vs from each other, and it cannot be determined whether the current state is a state of light load regeneration or not.

Thus, in the circuit configuration in which the direct-current voltage applied to the inverter device 4 is the sum of the terminal-to-terminal voltage Vb of the power storage device 9 and the overhead wire voltage Vs, such as the circuit configuration according to the present invention, it is preferred that a voltage sensor (DCPT) 7a that detects the overhead wire voltage Vs supplied from the current collector device 1 is provided between the current collector device 1 and the grounding point 10, and whether the current state is the state of light load regeneration or not is determined based on the overhead wire voltage Vs.

Alternatively, in view of the fact that the direct-current link voltage Vfc between the opposite terminals of the filter capacitor 3 is the sum of the overhead wire voltage Vs and the terminal-to-terminal voltage Vb of the power storage device 9, it is preferred that at least two of the voltage sensor (DCPT) 7a that detects the overhead wire voltage Vs, a voltage sensor (DCPT) 7b that detects the terminal-to-terminal voltage Vb of the power storage device 9 and a voltage sensor (DCPT) 7c that detects the direct-current link voltage Vfc between the opposite terminals of the filter capacitor 3 are provided, a voltage equivalent to the overhead wire voltage Vs is calculated from at least two voltage values of the direct-current link voltage Vfc between the opposite terminals of the filter capacitor 3, the terminal-to-terminal voltage Vb of the power storage device 9 and the overhead wire voltage Vs, and whether the current state is the state of light load regeneration or not is determined based on the overhead wire voltage Vs.

In the case of the circuit configuration according to the present invention, when it is determined based on the values Vfc, Vb and Vs that the current state is the state of light load regeneration, the inverter device 4 and the switching elements 11a and 11b are controlled to serve a regenerative energy absorption function.

A circuit operation during power running according to this embodiment will be described. In power running, the switch 14b is turned on. As a result, the grounding point-side terminal of the inverter device 4 and the negative side of the power storage device 9 are connected to the grounding point 10. Then, the voltage applied to the inverter device 4 approximately agrees with the voltage Vs supplied from the current collector device 1, and the inverter device 4 and the power storage device 9 are connected in parallel with each other.

The power storage device 9 can be discharged to supply an electric power to the inverter device 4 by cyclically turning on and off the switching element 11b. The first smoothing reactor 13 has a function of controlling the rate of change of the current flowing to the power storage device 9 below a predetermined value.

If the switching element 11b is turned on for a predetermined time Ton_b, the positive side and the negative side of the power storage device 9 are short-circuited, while the first smoothing reactor 13 controls the rate of increase of the current below a prescribed value and at the same time stores an amount of electric power energy equal to the time integration of the product of the current conducted in the period of Ton_b and the terminal-to-terminal voltage of the power storage device 9. Then, if the switching element 11b is turned off for a predetermined time Toff_b, the electric power energy stored in the first smoothing reactor 13 is discharged through the diode element 12a to a direct-current power part between the current collector device 1 and the inverter device 4.

Next, a circuit operation during regeneration will be described. In regeneration, the switch 14b is turned off. As a result, the voltage at the low potential-side terminal of the inverter device 4 decreases by the terminal-to-terminal voltage Vb of the power storage device 9 on the assumption that the grounding point 10 is a reference. On the other hand, the potential at the high potential-side terminal of the inverter device 4 is equal to the overhead wire voltage Vs on the assumption that the potential at the grounding point 10 is a reference potential. That is, the potential difference between the input terminal and the output terminal (between the positive terminal and the negative terminal) of the inverter device 4 is the sum of the terminal-to-terminal voltage Vb of the power storage device 9 and the overhead wire voltage Vs, Vb+Vs. In this way, a maximum regenerated power can be increased by (Vb+Vs)/Vs without changing a maximum conduction current of the inverter device 4 by increasing the potential difference between the input terminal and the output terminal (between the positive terminal and the negative terminal) of the inverter device 4 by the terminal-to-terminal voltage Vb of the power storage device 9. Meanwhile, the power storage device 9 is charged with an amount of electric power equal to the product of the terminal-to-terminal voltage Vb and a power storage device conduction current Ib (=an overhead wire current Is), Vb×Ib.

If the state of light load regeneration occurs, the main circuit configuration (serial type) is maintained, and the switching element 11a is cyclically turned on and off in accordance with the overhead wire voltage calculated from the values from the voltage sensors 7a to 7c, thereby charging the power storage device 9 with the regenerated electric power that has failed to be fed back to the overhead wire. The first smoothing reactor 13 has a function of controlling the rate of change of the current flowing to the power storage device 9 below a predetermined value.

If the switching element 11a is turned on for a predetermined time Ton_a, a current flows from a direct-current power part toward the power storage device 9 when the direct-current link voltage Vfc between the opposite terminals of the filter capacitor 3 described above is higher than the terminal-to-terminal voltage Vb of the power storage device 9. Meanwhile, the first smoothing reactor 13 controls the rate of increase of the current below a prescribed value and at the same time stores an amount of electric power energy equal to the time integration of the product of the current conducted in the period of Ton_a and the terminal-to-terminal voltage of the power storage device 9. Then, if the switching element 11a is turned off for a predetermined time Toff_a, a circuit is formed in which the electric power energy stored in the first smoothing reactor 13 is passed through the power storage device 9 from the high potential-side terminal to the low potential-side terminal and then returns to the first smoothing reactor 13 through the diode element 12b of the switching element 11b. That is, the power storage device 9 is continuously charged with the electric power energy stored in the first smoothing reactor 13 for the predetermined time Toff_a when the switching element 11a is in the off state, and the charging current attenuates as the electric power energy is discharged from the first smoothing reactor 13. In this way, the power storage device 9 is charged with an amount of electric power equal to the product of the terminal-to-terminal voltage Vb and the power storage device conduction current Ib (=the overhead wire current Is), Vb×Ib.

According to this embodiment of the present invention, the high speed range electric brake function and the regenerative energy absorption function can be provided at the same time without changing the main circuit configuration. In regeneration, the high speed range electric brake function performs the primary operation, and when the state of light load regeneration occurs, the regenerative energy absorption function is seamlessly activated. Thus, the energy saving effect can be maximized.

Seventh Embodiment

Figure 8:
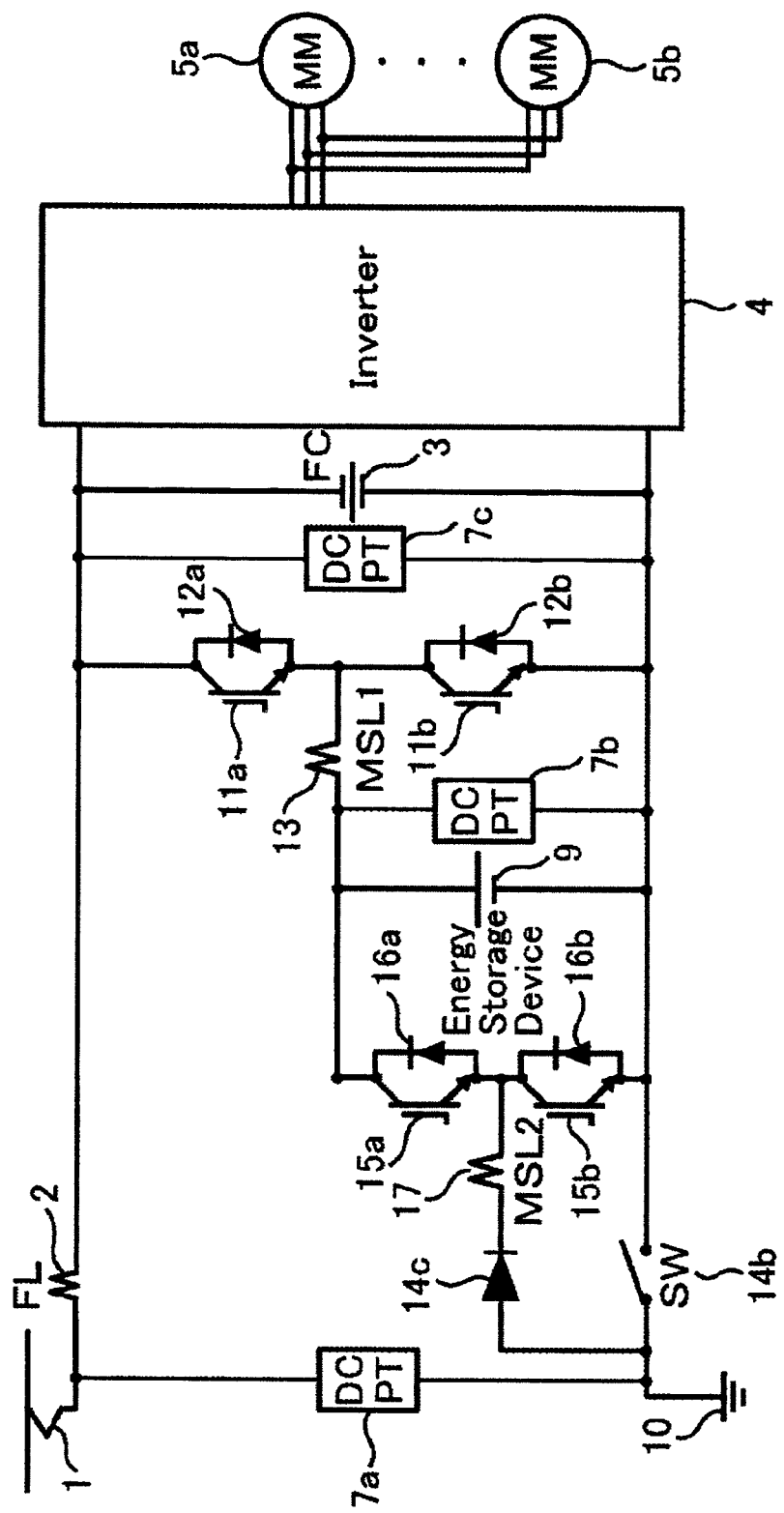
FIG. 8 is a diagram showing a first basic configuration of a drive device for a railway vehicle according to a seventh embodiment of the present invention.

FIG. 8 is a diagram showing a basic configuration of a drive device for a railway vehicle according to a seventh embodiment of the present invention.

The basic configuration according to the seventh embodiment differs from the basic configuration according to the sixth embodiment (FIG. 7) in that (1) switching elements 15a and 15b are connected between the positive side and the negative side of a power storage device 9, and the switching elements 15a and 15b are connected in parallel with diode elements 16a and 16b oriented in the opposite direction to the direction of conduction, respectively, at input and output terminals thereof, and (2) a diode element 14c is connected to the point of connection of the switching elements 15a and 15b via a second smoothing reactor 17.

The switching elements 15a and 15b, the diode elements 16a and 16b and the second smoothing reactor 17 form a step-down chopper circuit that uses the power storage device 9 as a power supply.

In the basic configuration according to the sixth embodiment (FIG. 7), the sum of the voltage of a direct-current voltage source and the voltage of the power storage device 9 is input to the inverter device 4 in regeneration. However, since the voltage of the power storage device 9 changes depending on the amount of charges stored therein, the voltage of the power storage device 9 changes with time depending on the state of charging or discharging. Typically, the voltage on the direct-current side of the inverter device 4 is preferably constant.

Thus, according to this embodiment, the step-down chopper circuit that uses the power storage device 9 as a power supply is formed to control the voltage applied to the inverter device 4 by the power storage device 9 to be constant, thereby eliminating the change of the voltage of the direct-current voltage source and making the voltage constant.

Figure 9:
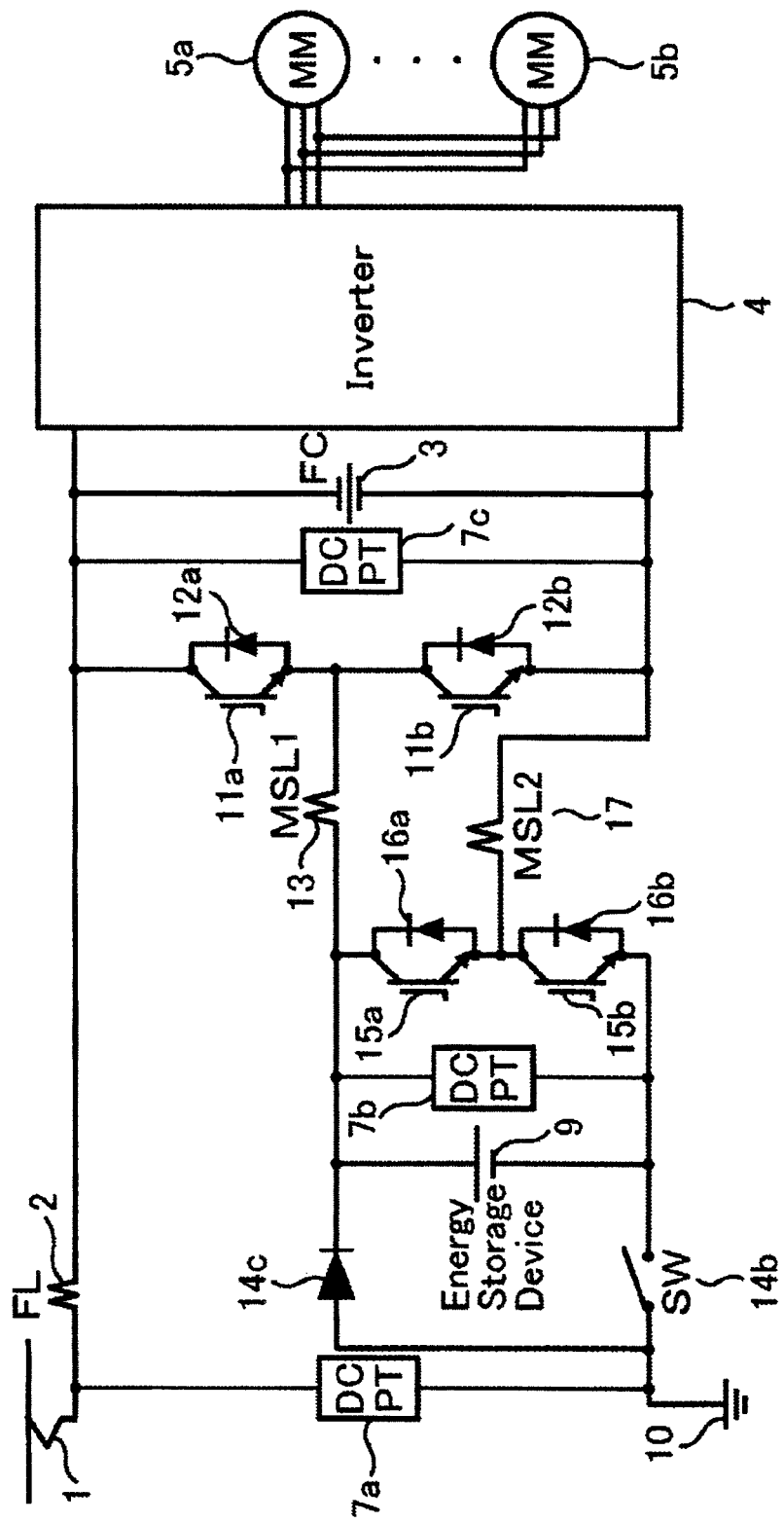
FIG. 9 is a diagram showing a second basic configuration of the drive device for a railway vehicle according to the seventh embodiment of the present invention.

Although the step-down chopper circuit formed by the switching elements 15a and 15b, the diode elements 16a and 16b and the second smoothing reactor 17 is disposed on the side of a grounding point 10 of the power storage device 9 according to this embodiment, the step-down chopper circuit may be disposed on the side of the inverter device 4 of the power storage device 9 as shown in FIG. 9.

In power running, a switch 14b is turned on so that a current flows from the negative side of the power storage device 9 to the grounding point 10. Furthermore, the electric power stored in the power storage device 9 can be supplied to the inverter device 4 by cyclically turning on and off a switching element 11b.

In regeneration, the switch 14b is turned off so that a current flows from the grounding point 10 to the second smoothing reactor 17 through the diode element 14c. As a result, a high speed range electric brake function and a regenerative energy absorption function can be provided at the same time as in the embodiments described above.

A direct-current power supplied from a current collector device 1 is input to the inverter device 4 after a fluctuation in a high frequency range is removed by an LC circuit (filter circuit) formed by a filter reactor (FL) 2 and a filter capacitor (FC) 3. The inverter device 4 converts the input direct-current power to a variable voltage variable frequency (VVVF) three-phase alternating-current power and drives main motors 5a and 5b. Although this drawing shows a case where the inverter device 4 drives two main motors, the number of main motors driven by the inverter device 4 is not particularly limited according to the present invention.

The grounding point 10 determines a reference potential for this circuit.

Switching elements 11a and 11b are current blocking means constituted by a semiconductor element. The switching elements 11a and 11b are connected in parallel with diode elements 12a and 12b oriented in the opposite direction to the direction of conduction, respectively, at input and output terminals thereof.

A first smoothing reactor (MSL) 13 is inserted in a power line connecting the point of connection of the switching elements 11a and 11b and a positive terminal of a power storage device 9. A negative terminal of the power storage device 9 is connected to a low potential-side terminal of the inverter device 4.

The switching elements 15a and 15b are current blocking means constituted by a semiconductor element. The switching elements 15a and 15b are connected in parallel with the diode elements 16a and 16b oriented in the opposite direction to the direction of conduction, respectively, at input and output terminals thereof.

The second smoothing reactor (MSL) 17 is inserted in a power line between the point of connection of the switching elements 15a and 15b and the diode element 14c.

The switching elements 15a and 15b, the diode elements 16a and 16b and the second smoothing reactor (MSL) 17 form the step-down chopper circuit that uses the power storage device 9 as a power supply and control the voltage to continuously vary between zero and the voltage value of the power storage device 9.

The diode element 14c is disposed between the grounding point 10 and the second smoothing reactor 17 and conducts only a current flowing from the grounding point 10 to the second smoothing reactor 17.

The switch 14b is disposed between the grounding point 10 and the negative terminal of the power storage device 9. The switch 14b is capable of conducting and blocking currents flowing in both directions and may be a circuit breaker having a mechanical contact or a combination of semiconductor-based current blocking means and a diode element.

In general, a control device for a railway vehicle controls the inverter device 4 based on a direct-current link voltage Vfc between the opposite terminals of the filter capacitor 3. However, in the case of the circuit configuration according to the present invention, the direct-current voltage applied to the inverter device 4 during regeneration is the sum of a voltage Vchp of the step-down chopper circuit formed by the switching elements 15a and 15b, the diode elements 16a and 16b and the second smoothing reactor (MSL) 17 and an overhead wire voltage Vs as described later, so that only detecting the direct-current link voltage Vfc is not enough to separate the voltage Vchp of the step-down chopper circuit and the overhead wire voltage Vs from each other, and it cannot be determined whether the current state is a state of light load regeneration or not. In addition, to make the step-down chopper operate to provide a desired voltage, a voltage Vb of the power storage device 9 is needed.

Thus, in the circuit configuration in which the direct-current voltage applied to the inverter device 4 is the sum of the voltage Vchp of the step-down chopper circuit and the overhead wire voltage Vs, such as the circuit configuration according to the present invention, it is preferred that a voltage sensor (DCPT) 7a that detects the overhead wire voltage Vs supplied from the current collector device 1 is provided between the current collector device 1 and the grounding point 10, and whether the current state is the state of light load regeneration or not is determined based on the overhead wire voltage Vs.

Alternatively, in view of the fact that the direct-current link voltage Vfc between the opposite terminals of the filter capacitor 3 is the sum of the overhead wire voltage Vs and the voltage Vchp of the step-down chopper circuit, it is preferred that at least two of the voltage sensor (DCPT) 7a that detects the overhead wire voltage Vs, a voltage sensor (DCPT) 7b that detects a terminal-to-terminal voltage Vb of the power storage device 9 and a voltage sensor (DCPT) 7c that detects the direct-current link voltage Vfc between the opposite terminals of the filter capacitor 3 are provided, a voltage equivalent to the overhead wire voltage Vs is calculated from at least two voltage values of the direct-current link voltage Vfc between the opposite terminals of the filter capacitor 3, the terminal-to-terminal voltage Vb of the power storage device 9 and the overhead wire voltage Vs, and whether the current state is the state of light load regeneration or not is determined based on the overhead wire voltage Vs.

In the case of the circuit configuration according to the present invention, when it is determined based on the values Vfc, Vb and Vs that the current state is the state of light load regeneration, the inverter device 4 and the switching elements 11a and 11b are controlled to serve a regenerative energy absorption function.

A circuit operation during power running according to this embodiment will be described. In power running, the switch 14b is turned on. As a result, the grounding point-side terminal of the inverter device 4 and the negative side of the power storage device 9 are connected to the grounding point 10. Then, the voltage applied to the inverter device 4 approximately agrees with the voltage Vs supplied from the current collector device 1, and the inverter device 4 and the power storage device 9 are connected in parallel with each other.

The power storage device 9 can be discharged to supply an electric power to the inverter device 4 by cyclically turning on and off the switching element 11b. The first smoothing reactor 13 has a function of controlling the rate of change of the current flowing to the power storage device 9 below a predetermined value.

If the switching element 11b is turned on for a predetermined time Ton_b, the positive side and the negative side of the power storage device 9 are short-circuited, while the first smoothing reactor 13 controls the rate of increase of the current below a prescribed value and at the same time stores an amount of electric power energy equal to the time integration of the product of the current conducted in the period of Ton_b and the terminal-to-terminal voltage of the power storage device 9. Then, if the switching element 11b is turned off for a predetermined time Toff_b, the electric power energy stored in the first smoothing reactor 13 is discharged through the diode element 12a to a direct-current power part between the current collector device 1 and the inverter device 4.

Next, a circuit operation during regeneration will be described. In regeneration, the switch 14b is turned off. As a result, the voltage at the low potential-side terminal of the inverter device 4 decreases by the voltage Vchp of the step-down chopper circuit on the assumption that the grounding point 10 is a reference as shown in FIG. 10.

On the other hand, the potential at the high potential-side terminal of the inverter device 4 is equal to the overhead wire voltage Vs on the assumption that the potential at the grounding point 10 is a reference potential. That is, the potential difference between the input terminal and the output terminal (between the positive terminal and the negative terminal) of the inverter device 4 is the sum of the overhead wire voltage Vs and the voltage Vchp of the step-down chopper circuit, Vchp+Vs. In this way, a maximum regenerated power can be increased by (Vchp+Vs)/Vs without changing a maximum conduction current of the inverter device 4 by increasing the potential difference between the input terminal and the output terminal (between the positive terminal and the negative terminal) of the inverter device 4 by the terminal-to-terminal voltage Vchp of the power storage device 9. Meanwhile, the power storage device 9 is charged with an amount of electric power equal to the product of the voltage Vchp of the step-down chopper and a current Ichp of the step-down chopper (=an overhead wire current Is), Vchp×Ichp.

If the state of light load regeneration occurs, the main circuit configuration (serial type) is maintained, and the switching element 11a is cyclically turned on and off in accordance with the overhead wire voltage calculated from the values from the voltage sensors 7a to 7c, thereby charging the power storage device 9 with the regenerated electric power that has failed to be fed back to the overhead wire. The first smoothing reactor 13 has a function of controlling the rate of change of the current flowing to the power storage device 9 below a predetermined value.

If the switching element 11a is turned on for a predetermined time Ton_a, a current flows from a direct-current power part toward the power storage device 9 when the direct-current link voltage Vfc between the opposite terminals of the filter capacitor 3 described above is higher than the terminal-to-terminal voltage Vb of the power storage device 9. Meanwhile, the first smoothing reactor 13 controls the rate of increase of the current below a prescribed value and at the same time stores an amount of electric power energy equal to the time integration of the product of the current conducted in the period of Ton_a and the terminal-to-terminal voltage of the power storage device 9. Then, if the switching element 11a is turned off for a predetermined time Toff_a, a circuit is formed in which the electric power energy stored in the first smoothing reactor 13 is passed through the power storage device 9 from the high potential-side terminal to the low potential-side terminal and then returns to the first smoothing reactor 13 through the diode element 12b of the switching element 11b. That is, the power storage device 9 is continuously charged with the electric power energy stored in the first smoothing reactor 13 for the predetermined time Toff_a when the switching element 11a is in the off state, and the charging current attenuates as the electric power energy is discharged from the first smoothing reactor 13. In this way, the power storage device 9 is charged with an amount of electric power equal to the product of the voltage Vchp of the step-down chopper and the current Ichp of the step-down chopper (=the overhead wire current Is), Vchp×Ichp.

According to this embodiment of the present invention, the high speed range electric brake function and the regenerative energy absorption function can be provided at the same time without changing the main circuit configuration. In regeneration, the high speed range electric brake function performs the primary operation, and when the state of light load regeneration occurs, the regenerative energy absorption function is seamlessly activated. Thus, the energy saving effect can be maximized.

Eighth Embodiment

Figure 12:
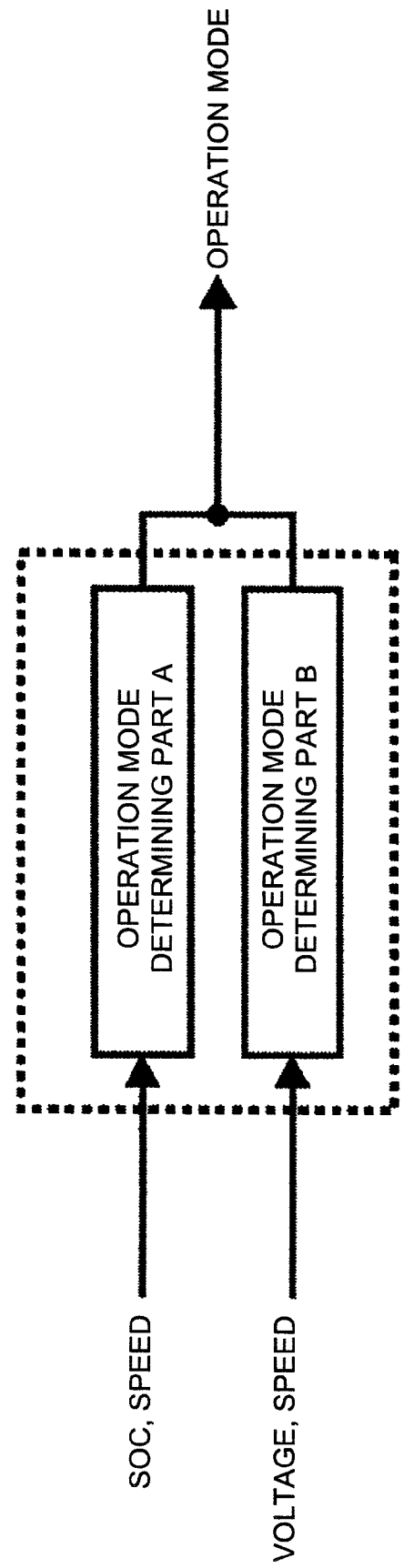
FIG. 12 is a first diagram for illustrating a first example of a method of determining the operation mode (the high speed range electric brake function mode, the regenerative energy absorption function mode or the normal regeneration mode) of the drive device for a railway vehicle according to the present invention.

FIG. 12 is a diagram showing a first example of a method of determining an operation mode (a high speed range electric brake function mode, a regenerative energy absorption function mode or a normal regeneration mode that is neither the high speed range electric brake function mode nor the regenerative energy absorption function mode (referred to simply as a normal regeneration mode, hereinafter)) of a drive device for a railway vehicle according to the present invention.

Figure 11:
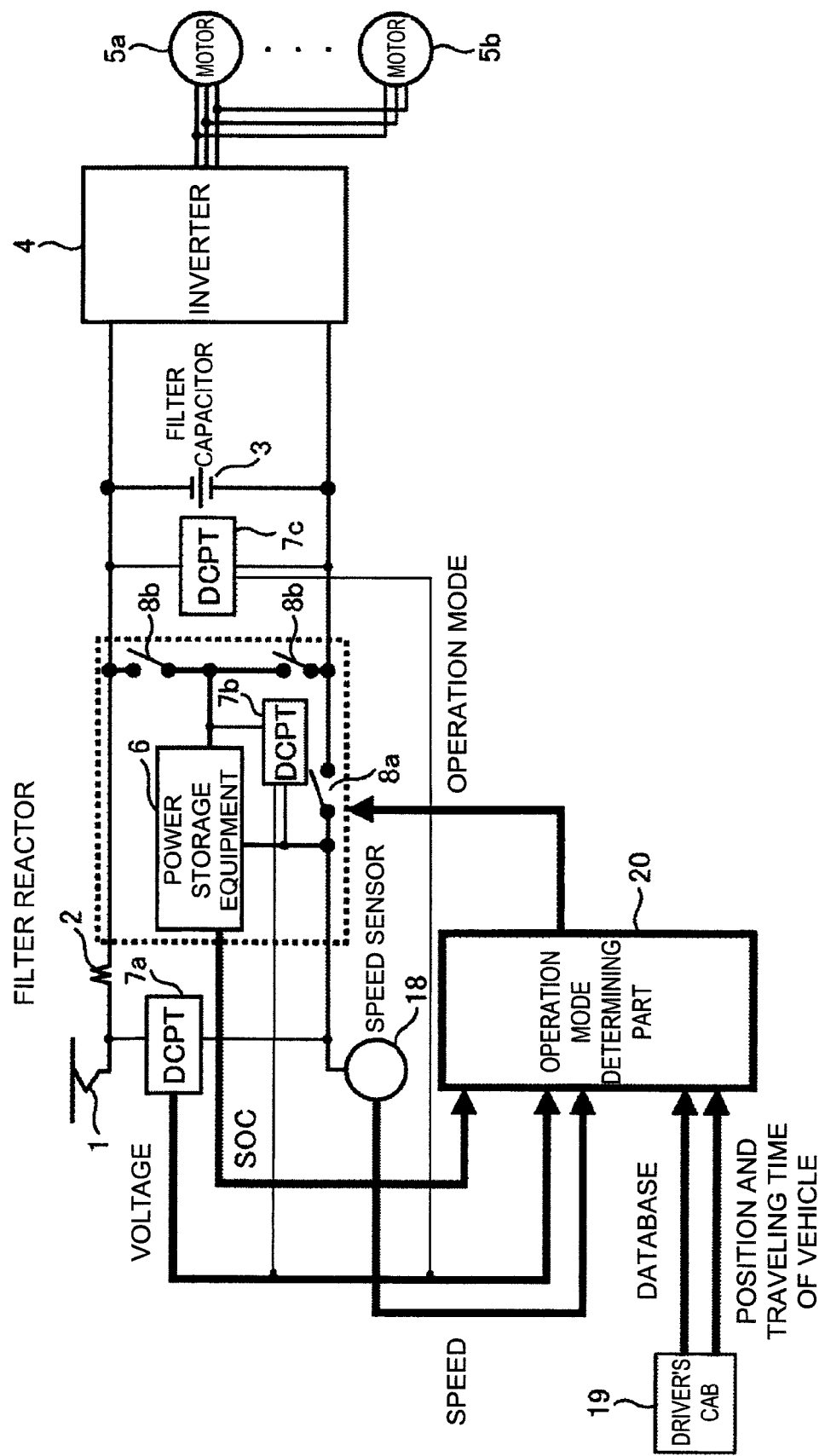
FIG. 11 is a diagram showing an operation mode determining part that determines an operation mode (a high speed range electric brake function mode, a regenerative energy absorption function mode or a normal regeneration mode) of the drive device for a railway vehicle according to the present invention.

In the drive device for a railway vehicle shown in FIG. 3 that comprises a current collector device 1 that receives a direct-current power from a direct-current voltage source, an LC circuit (filter circuit) formed by a filter reactor (FL) 2 and a filter capacitor (FC) 3, an inverter device 4 that converts the direct-current power town alternating-current power, one or more alternating-current motors 5 driven by the inverter device 4, and power storage equipment 6 (formed by power storage device, such as a storage battery and a capacitor, and a buck-boost chopper, for example) capable of charging and discharging on the direct-current power side of the inverter device 4, and is characterized in that at least two of a voltage sensor (DCPT) 7a that detects an overhead wire voltage Vs, a voltage sensor (DCPT) 7b that detects a voltage Vb of the power storage equipment 6 and a voltage sensor (DCPT) 7c that detects a direct-current link voltage Vfc between the opposite terminals of the filter capacitor 3 are provided, and a high speed range electric brake function and a regenerative energy absorption function can be provided at the same time by connecting the power storage equipment 6 and the inverter device 4 in series with or in parallel with each other, it is preferred that the drive device has an operation mode determining part 20 that determines the operation mode (the high speed range electric brake function mode, the regenerative energy absorption function mode and the normal regeneration mode) based on input information, which includes (1) the state of charge (SOC) from the power storage equipment 6, (2) the voltages from the voltage sensors 7a to 7c and the speed from a speed sensor 18, and (3) information from a database that stores the traffic density for each route and the operation pattern from a driver's cab 19 and the position and the traveling time of the vehicle, as shown in FIG. 11.

Although the circuit shown in FIG. 3 is configured to switch between the high speed range electric brake function and the regenerative energy absorption function by switching the main circuit configuration between the serial type and the parallel type, any circuit configuration that can provide the high speed range electric brake function and the regenerative energy absorption function at the same time can be used.

According to this embodiment, the operation mode is selected from among the high speed range electric brake function mode, the regenerative energy absorption function mode and the normal regeneration mode based on (1) the state of charge (SOC) of the power storage device and the speed and (2) the voltage and the speed of the input information given to the operation mode determining part, as shown in FIG. 12.

Figure 13:
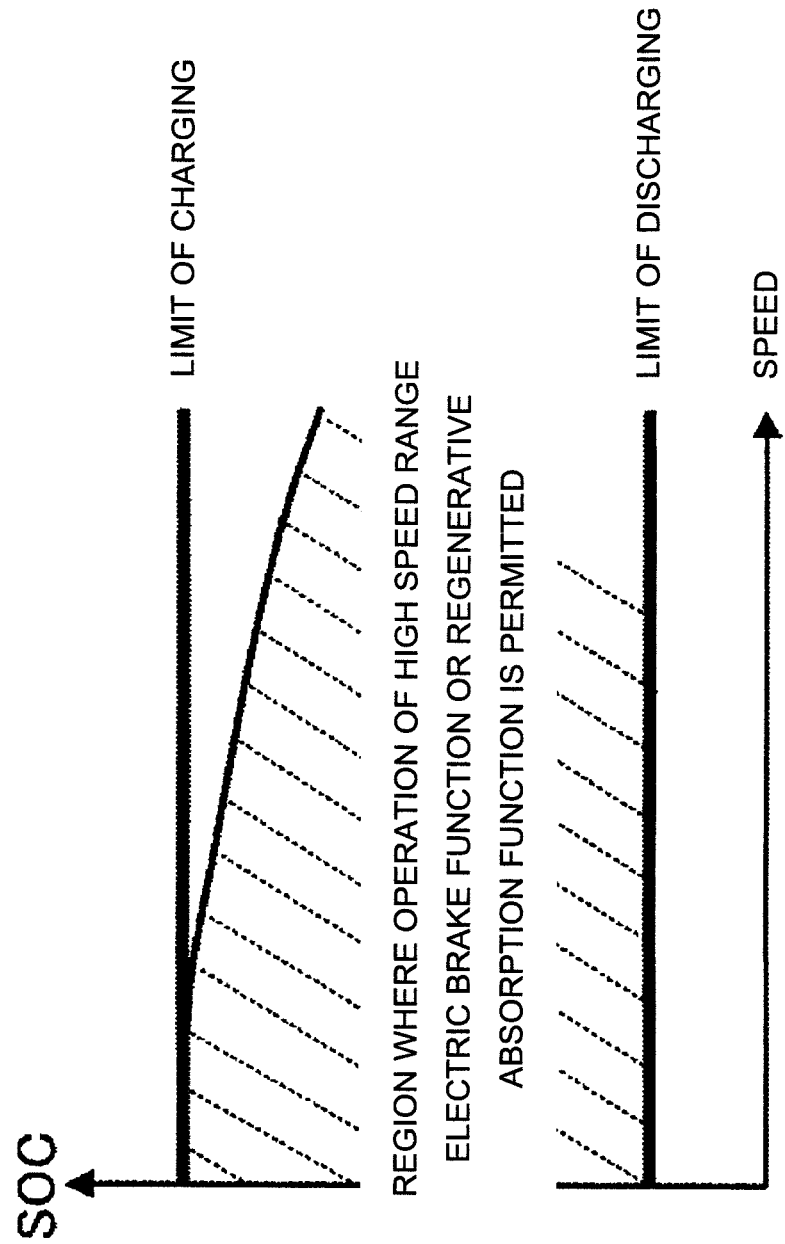
FIG. 13 is a second diagram for illustrating the first example to a third example of the method of determining the operation mode (the high speed range electric brake function mode, the regenerative energy absorption function mode or the normal regeneration mode) of the drive device for a railway vehicle according to the present invention.

It is preferred that an operation mode determining part A shown in FIG. 12 first determines the operation mode based on the state of charge (SOC) and the speed as shown in FIG. 13.

More specifically, in order to prevent an overcharge of the power storage device from the view point of safety, it is preferred that an upper limit value of the state of charge (SOC) is set, a charging operation of the high speed range electric brake function or the regenerative energy absorption function is permitted if the state of charge (SOC) is equal to or lower than the upper limit value, and the charging operation of the high speed range electric brake function or the regenerative energy absorption function is stopped and the normal regeneration is started if the state of charge (SOC) exceeds the upper limit value. This is because if the charging operation of the high speed range electric brake function or the regenerative energy absorption function lasts for a long time, the state of charge (SOC) of the power storage device increases, and the power storage device is overcharged, which can lead to ignition of or damage to the power storage device. The upper limit value of the state of charge (SOC) is preferably lowered as the speed increases as shown in FIG. 13. This is because the higher the speed at which regeneration occurs, the longer the regeneration duration becomes, and the larger the amount of the electric power stored in the power storage device becomes.

Figure 14:
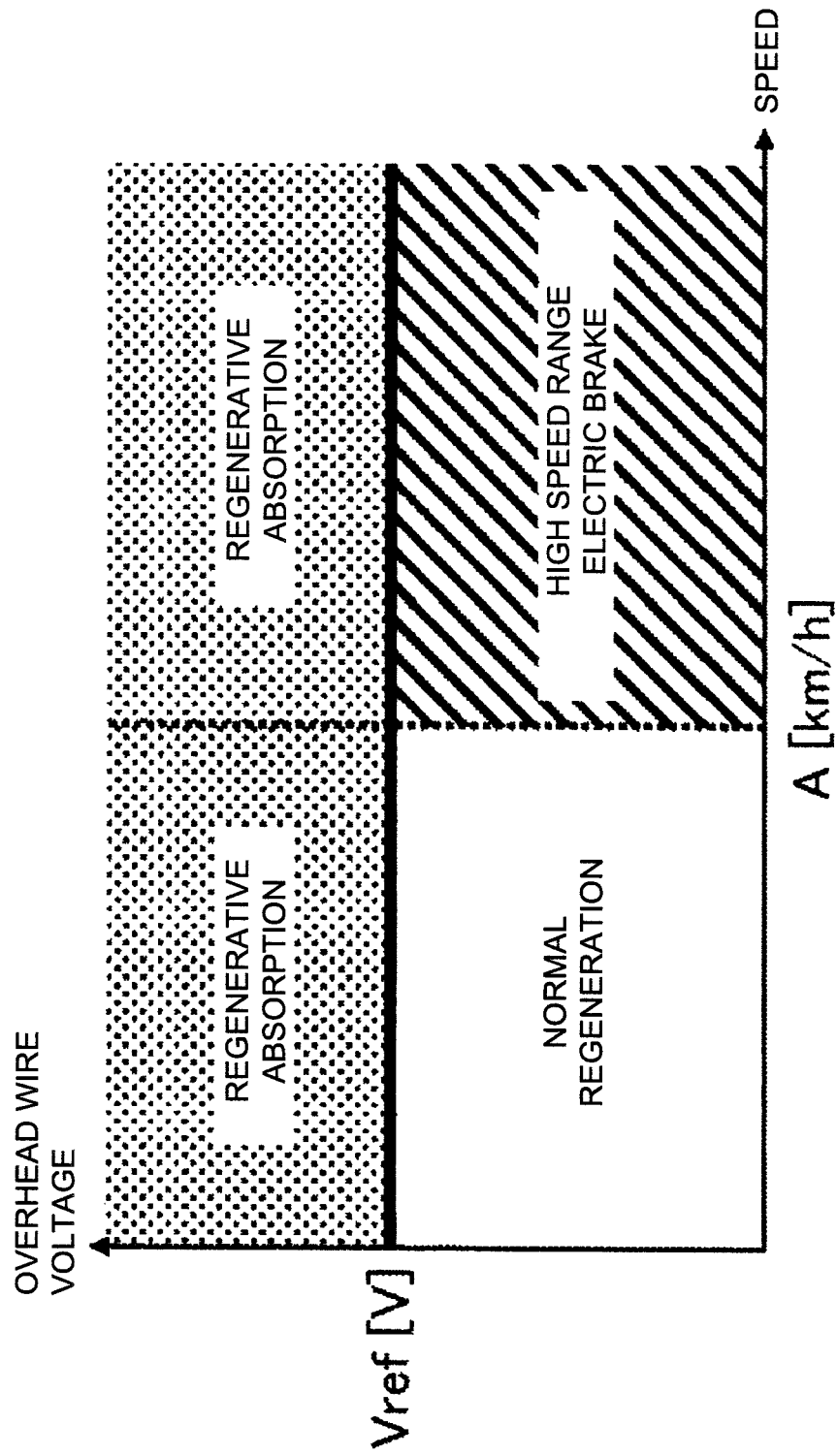
FIG. 14 is a third diagram for illustrating the first example of the method of determining the operation mode (the high speed range electric brake function mode, the regenerative energy absorption function mode or the normal regeneration mode) of the drive device for a railway vehicle according to the present invention.

Then, if the charging operation of the high speed range electric brake function or the regenerative energy absorption function is permitted based on the state of charge (SOC) and the speed in the preceding step, it is preferred that an operation mode determining part B shown in FIG. 12 determines the operation mode based on the overhead wire voltage from the voltage sensors 7a to 7c and the speed from the speed sensor 18 as shown in FIG. 14.

More specifically, it is preferred that the overhead wire voltage Vs is calculated from the voltage value from the voltage sensor (DCPT) 7a that detects the overhead wire voltage Vs or the voltage values from at least two of the voltage sensor (DCPT) 7a that detects the overhead wire voltage Vs, the voltage sensor (DCPT) 7b that detects the voltage Vb of the power storage equipment 6 and the voltage sensor (DCPT) 7c that detects the direct-current link voltage Vfc between the opposite terminals of the filter capacitor 3, the filter capacitor voltage is boosted to a desired value by the high speed range electric brake function if the overhead wire voltage is lower than a voltage value that is a criterion for determining that the current state is the state of light load regeneration (referred to as a light load regeneration set value (Vref [V])), and it is determined that the current state is the state of light load regeneration and the filter capacitor voltage is lowered to a desired value by the regenerative energy absorption function if the overhead wire voltage is higher than the light load regeneration set value (Vref [V]).

The boosting operation of the high speed range electric brake function is effective in a high speed range (higher than a constant torque terminal velocity (A km/h)) but is not effective in a low speed range (equal to or lower than the constant torque terminal velocity (A km/h)) because the regeneration performance is not limited by the main motor in the low speed range. Therefore, it is preferred that the high speed range electric brake function is activated when the speed is higher than the constant torque terminal velocity (A km/h), and the boosting operation of the high speed range electric brake function is stopped and the normal regeneration is started if the speed becomes equal to or lower than the constant torque terminal velocity (A km/h). Since the boosting operation is stopped in the low speed range (equal to or lower than the constant torque terminal velocity (A km/h)), useless charging of the power storage device can be avoided, and the life of the power storage device can be prolonged accordingly.

According to this embodiment of the present invention, the high speed range electric brake function operation, the regenerative energy absorption function operation and the normal regeneration operation can be properly managed in accordance with the overhead wire voltage, the speed and the state of charge (SOC). Thus, the energy saving effect can be maximized, and the life of the power storage device can be prolonged.

Ninth Embodiment

Figure 15:
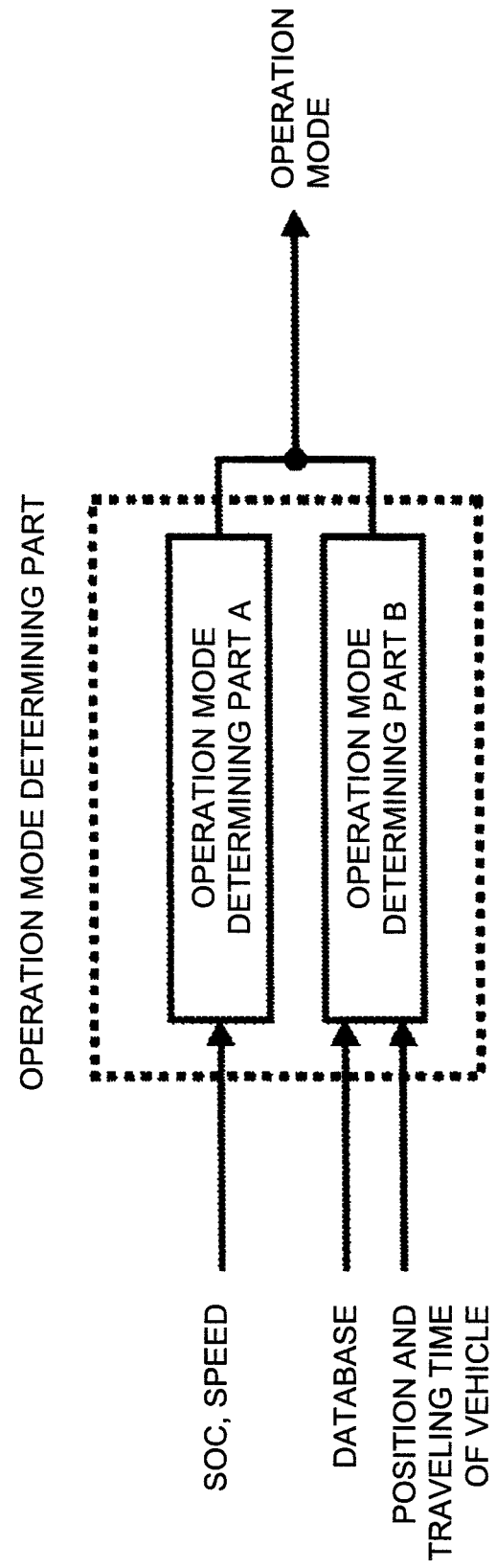
FIG. 15 is a first diagram for illustrating a second example of the method of determining the operation mode (the high speed range electric brake function mode, the regenerative energy absorption function mode or the normal regeneration mode) of the drive device for a railway vehicle according to the present invention.

FIG. 15 is a diagram showing a second example of the method of determining an operation mode (a high speed range electric brake function mode, a regenerative energy absorption function mode or a normal regeneration mode that is neither the high speed range electric brake function mode nor the regenerative energy absorption function mode (referred to simply as a normal regeneration mode, hereinafter)) of a drive device for a railway vehicle according to the present invention.

In the drive device for a railway vehicle shown in FIG. 3 that comprises a current collector device 1 that receives a direct-current power from a direct-current voltage source, an LC circuit (filter circuit) formed by a filter reactor (FL) 2 and a filter capacitor (FC) 3, an inverter device 4 that converts the direct-current power to an alternating-current power, one or more alternating-current motors 5 driven by the inverter device 4, and power storage equipment 6 (formed by power storage device, such as a storage battery and a capacitor, and a buck-boost chopper, for example) capable of charging and discharging on the direct-current power side of the inverter device 4, and is characterized in that at least two of a voltage sensor (DCPT) 7a that detects an overhead wire voltage Vs, a voltage sensor (DCPT) 7b that detects a voltage Vb of the power storage equipment 6 and a voltage sensor (DCPT) 7c that detects a direct-current link voltage Vfc between the opposite terminals of the filter capacitor 3 are provided, and a high speed range electric brake function and a regenerative energy absorption function can be provided at the same time by connecting the power storage equipment 6 and the inverter device 4 in series with or in parallel with each other, it is preferred that the drive device has an operation mode determining part 20 that determines the operation mode (the high speed range electric brake function mode, the regenerative energy absorption function mode and the normal regeneration mode) based on input information, which includes (1) the state of charge (SOC) from the power storage equipment 6, (2) the voltages from the voltage sensors 7a to 7c and the speed from a speed sensor 18, and (3) information from a database that stores the traffic density for each route and the operation pattern from a driver's cab 19 and the position and the traveling time of the vehicle, as shown in FIG. 11.

Although the circuit shown in FIG. 3 is configured to switch between the high speed range electric brake function and the regenerative energy absorption function by switching the main circuit configuration between the serial type and the parallel type, any circuit configuration that can provide the high speed range electric brake function and the regenerative energy absorption function at the same time can be used.

According to this embodiment, the operation mode is selected from among the high speed range electric brake function mode, the regenerative energy absorption function mode and the normal regeneration mode based on, among other input information given to the operation mode determining part, (1) the state of charge (SOC) of the power storage device and the speed and (2) the information from the database that stores the traffic density with respect to the position and the traveling time for each route (referred to simply as a traffic density, hereinafter) and the speed for the position and the traveling time for each route (referred to as an operation pattern, hereinafter) and the position and the traveling time of the vehicle, as shown in FIG. 15.

It is preferred that an operation mode determining part A shown in FIG. 15 first determines the operation mode based on the state of charge (SOC) and the speed as shown in FIG. 13.

More specifically, in order to prevent an overcharge of the power storage device from the view point of safety, it is preferred that an upper limit value of the state of charge (SOC) is set, a charging operation of the high speed range electric brake function or the regenerative energy absorption function is permitted if the state of charge (SOC) is equal to or lower than the upper limit value, and the charging operation of the high speed range electric brake function or the regenerative energy absorption function is stopped and the normal regeneration is started if the state of charge (SOC) exceeds the upper limit value. This is because if the charging operation of the high speed range electric brake function or the regenerative energy absorption function lasts for a long time, the state of charge (SOC) of the power storage device increases, and the power storage device is overcharged, which can lead to ignition of or damage to the power storage device. The upper limit value of the state of charge (SOC) is preferably lowered as the speed increases as shown in FIG. 13. This is because the higher the speed at which regeneration occurs, the longer the regeneration duration becomes, and the larger the amount of the electric power stored in the power storage device becomes.

Figure 16:
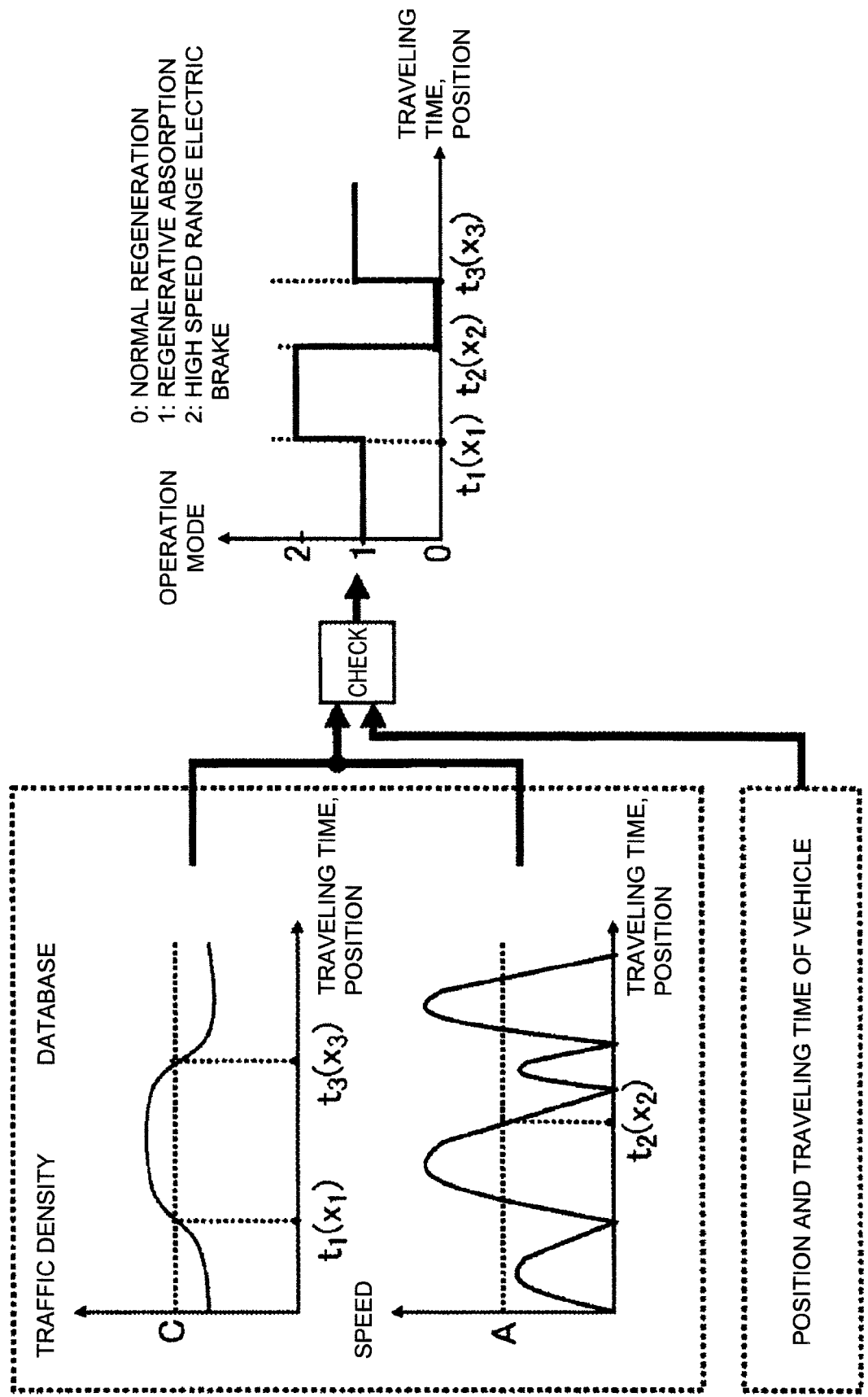
FIG. 16 is a third diagram for illustrating the second example of the method of determining the operation mode (the high speed range electric brake function mode, the regenerative energy absorption function mode or the normal regeneration mode) of the drive device for a railway vehicle according to the present invention.

Then, if the charging operation of the high speed range electric brake function or the regenerative energy absorption function is permitted based on the state of charge (SOC) and the speed in the preceding step, it is preferred that an operation mode determining part B shown in FIG. 15 determines in advance the operation mode for the position and the traveling time of the vehicle based on the information from the database that stores the traffic density and the operation pattern for each route and the position and the traveling time of the vehicle as shown in FIG. 16.

More specifically, a database that stores the traffic density and the operation pattern for each route is provided, and a feature that constantly monitors the current position and the current traveling time of the vehicle is provided. The position and the traveling time at which the state of light load regeneration occurs are predicted in advance from the traffic density information stored in the database (it is determined that the state of light load regeneration has occurred if the traffic density is lower than a value C). At the same time, the position and the traveling time at which the speed becomes equal to or lower than a constant torque terminal velocity (A) are predicted in advance from the operation pattern information stored in the database. The current position and the current traveling time of the vehicle are checked against the traffic density information stored in the database. If it is determined that the current position and the current traveling time are those at which the state of light load regeneration occurs, the regenerative energy absorption function is selected as the operation mode, and if it is determined that the current position and the current traveling time are not those at which the state of light load regeneration occurs, the high speed range electric brake function is selected as the operation mode. In the case where the high speed range electric brake function is selected as the operation mode based on the traffic density information stored in the database, it is preferred that the current position and the current traveling time of the vehicle are checked against the operation pattern information stored in the database, and if it is determined that the current position and the current traveling time are those at which the speed becomes equal to or lower than the constant torque terminal velocity, the normal regeneration is selected as the operation mode.

The database information may be provided in the vehicle (driver's cab 19) as shown in FIG. 11 or may be acquired from the outside of the vehicle by communications.

According to this embodiment of the present invention, the high speed range electric brake function operation, the regenerative energy absorption function operation and the normal regeneration operation can be properly managed in accordance with the database information, the position and the traveling time of the vehicle, the state of charge (SOC) and the speed. Thus, the energy saving effect can be maximized, and the life of the power storage device can be prolonged.

Tenth Embodiment

Figure 17:
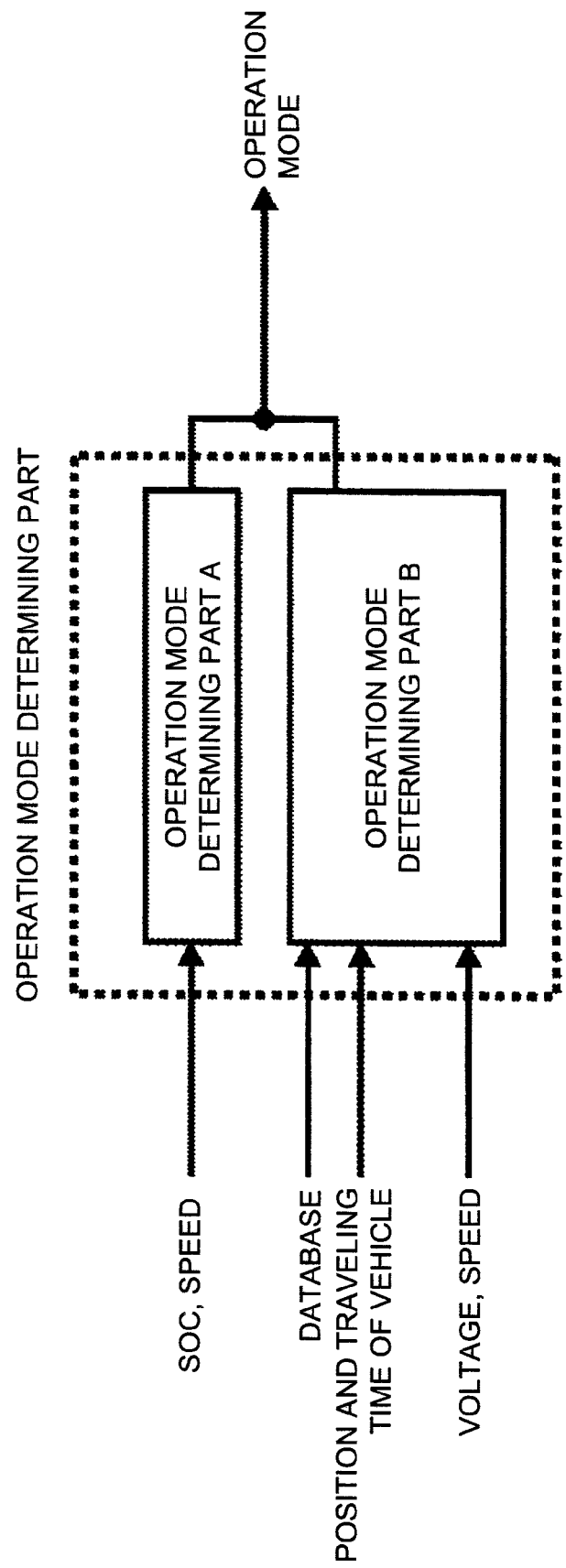
FIG. 17 is a first diagram for illustrating the third example of the method of determining the operation mode (the high speed range electric brake function mode, the regenerative energy absorption function mode or the normal regeneration mode) of the drive device for a railway vehicle according to the present invention.

FIG. 17 is a diagram showing a third example of the method of determining an operation mode (a high speed range electric brake function mode, a regenerative energy absorption function mode or a normal regeneration mode that is neither the high speed range electric brake function mode nor the regenerative energy absorption function mode (referred to simply as a normal regeneration mode, hereinafter)) of a drive device for a railway vehicle according to the present invention.

In the drive device for a railway vehicle shown in FIG. 3 that comprises a current collector device 1 that receives a direct-current power from a direct-current voltage source, an LC circuit (filter circuit) formed by a filter reactor (FL) 2 and a filter capacitor (FC) 3, an inverter device 4 that converts the direct-current power to an alternating-current power, one or more alternating-current motors 5 driven by the inverter device 4, and power storage equipment 6 (formed by power storage device, such as a storage battery and a capacitor, and a buck-boost chopper, for example) capable of charging and discharging on the direct-current power side of the inverter device 4, and is characterized in that at least two of a voltage sensor (DCPT) 7a that detects an overhead wire voltage Vs, a voltage sensor (DCPT) 7b that detects a voltage Vb of the power storage equipment 6 and a voltage sensor (DCPT) 7c that detects a direct-current link voltage Vfc between the opposite terminals of the filter capacitor 3 are provided, and a high speed range electric brake function and a regenerative energy absorption function can be provided at the same time by connecting the power storage equipment 6 and the inverter device 4 in series with or in parallel with each other, it is preferred that the drive device has an operation mode determining part 20 that determines the operation mode (the high speed range electric brake function mode, the regenerative energy absorption function mode and the normal regeneration mode) based on input information, which includes (1) the state of charge (SOC) from the power storage equipment 6, (2) the voltages from the voltage sensors 7a to 7c and the speed from a speed sensor 18, and (3) information from a database that stores the traffic density for each route and the operation pattern from a driver's cab 19 and the position and the traveling time of the vehicle, as shown in FIG. 11.

Although the circuit shown in FIG. 3 is configured to switch between the high speed range electric brake function and the regenerative energy absorption function by switching the main circuit configuration between the serial type and the parallel type, any circuit configuration that can provide the high speed range electric brake function and the regenerative energy absorption function at the same time can be used.

According to this embodiment, the operation mode is selected from among the high speed range electric brake function mode, the regenerative energy absorption function mode and the normal regeneration mode based on, among other input information given to the operation mode determining part, (1) the state of charge (SOC) of the power storage device and the speed, (2) the voltage and the speed and (3) the information from the database that stores the traffic density with respect to the position and the traveling time for each route (referred to simply as a traffic density, hereinafter) and the speed for the position and the traveling time for each route (referred to as an operation pattern, hereinafter) and the position and the traveling time of the vehicle, as shown in FIG. 17.

It is preferred that an operation mode determining part A shown in FIG. 17 first determines the operation mode based on the state of charge (SOC) and the speed as shown in FIG. 13.

More specifically, in order to prevent an overcharge of the power storage device from the view point of safety, it is preferred that an upper limit value of the state of charge (SOC) is set, a charging operation of the high speed range electric brake function or the regenerative energy absorption function is permitted if the state of charge (SOC) is equal to or lower than the upper limit value, and the charging operation of the high speed range electric brake function or the regenerative energy absorption function is stopped and the normal regeneration is started if the state of charge (SOC) exceeds the upper limit value. This is because if the charging operation of the high speed range electric brake function or the regenerative energy absorption function lasts for a long time, the state of charge (SOC) of the power storage device increases, and the power storage device is overcharged, which can lead to ignition of or damage to the power storage device. The upper limit value of the state of charge (SOC) is preferably lowered as the speed increases as shown in FIG. 13. This is because the higher the speed at which regeneration occurs, the longer the regeneration duration becomes, and the larger the amount of the electric power stored in the power storage device becomes.

Figure 18:
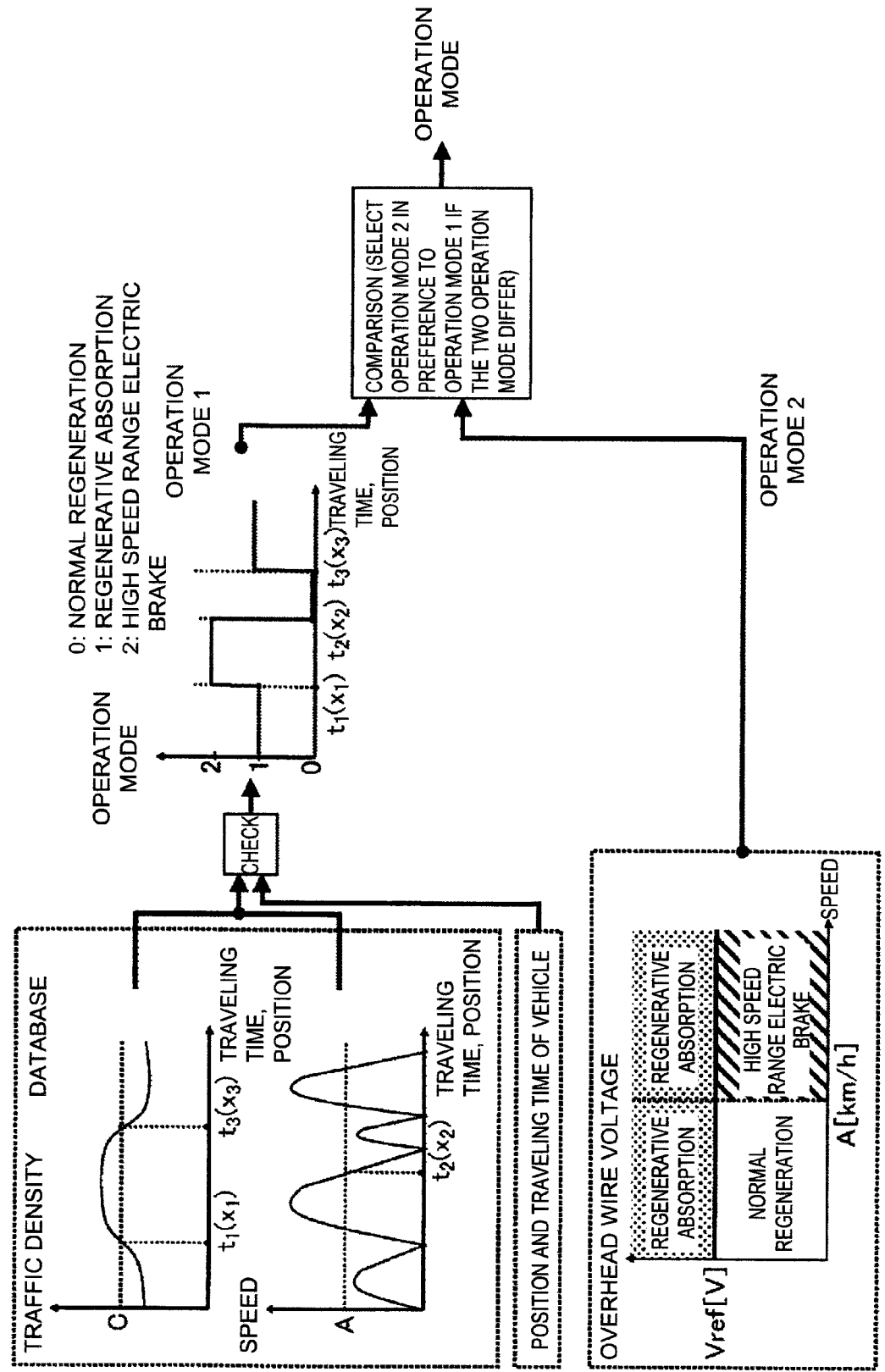
FIG. 18 is a third diagram for illustrating the third example of the method of determining the operation mode (the high speed range electric brake function mode, the regenerative energy absorption function mode or the normal regeneration mode) of the drive device for a railway vehicle according to the present invention.

Then, if the charging operation of the high speed range electric brake function or the regenerative energy absorption function is permitted based on the state of charge (SOC) and the speed in the preceding step, it is preferred that an operation mode determining part B shown in FIG. 17 determines in advance an operation mode (operation mode 1) for the position and the traveling time of the vehicle based on the information from the database that stores the traffic density and the operation pattern for each route and the position and the traveling time of the vehicle as shown in FIG. 18, determines an operation mode (operation mode 2) based on the overhead wire voltage calculated from the values from the voltage sensors 7a to 7c and the speed from the speed sensor 18, compares the operation mode (operation mode 1) determined in advance based on the database information and the position and the traveling time of the vehicle and the operation mode (operation mode 2) determined based on the overhead wire voltage and the speed, and selects the operation mode (operation mode 2) determined based on the overhead wire voltage and the speed in preference to the operation mode 1 if the two operation modes differ from each other.

Although the database that stores the traffic density and the operation pattern for each route is provided and the operation mode for the position and the traveling time of the vehicle is determined in advance based on the database information and the position and the traveling time of the vehicle according to the method of the ninth embodiment, the traffic density and the operation pattern may differ from the actual traffic density and the actual operation pattern, and in such a case, the operation mode cannot be properly selected.

Thus, it is preferred that the operation mode is determined not only in the method of determining in advance the operation mode based on the database information and the position and the traveling time of the vehicle according to the ninth embodiment but also in the method of determining the operation mode based on the overhead wire voltage calculated from the values from the voltage sensors 7a to 7c and the speed from the speed sensor 18 according to the eighth embodiment, the operation mode (operation mode 1) determined in advance based on the database information and the position and the traveling time of the vehicle and the operation mode (operation mode 2) determined based on the overhead wire voltage and the speed, and the operation mode (operation mode 2) determined based on the overhead wire voltage and the speed is selected in preference to the operation mode 1 if the two operation modes differ from each other.

The database information may be provided in the vehicle (driver's cab 19) as shown in FIG. 11 or may be acquired from the outside of the vehicle by communications.

According to this embodiment of the present invention, the high speed range electric brake function operation, the regenerative energy absorption function operation and the normal regeneration operation can be properly managed in accordance with the overhead wire voltage, the speed, the database information, the position and the traveling time of the vehicle and the state of charge (SOC). Thus, the energy saving effect can be maximized, and the life of the power storage device can be prolonged.

REFERENCE SIGNS LIST 1 current collector device
2 filter rector
3 filter capacitor
4 inverter device
5a to 5b main motor
6 power storage equipment
7a to 7c voltage sensor
8a to 8c, 14a to 14b switch
9 power storage device
10 grounding point
11a to 11b, 15a to 15b switching element
12a to 12b, 14c, 16a to 16b diode element
13 first smoothing reactor
17 second smoothing reactor
18 speed sensor
19 driver's cab
20 operation mode determining part

The invention claimed is:

1. A drive device for a railway vehicle, comprising:
a current collector device acquiring a direct-current power from a direct-current voltage source;
an inverter device that converts the direct-current power to an alternating-current power;
one or more alternating-current motors driven by the inverter device; and
a power storage device connecting to a direct-current power side of the inverter device,
the driving device for a railway vehicle controlling the power storage device based on voltage values obtained from at least two of a first voltage sensor detecting a voltage of the direct-current voltage source, a second voltage sensor detecting a voltage of the power storage device and a third voltage sensor detecting a voltage on the direct-current side of the inverter device, wherein drive device for a railway vehicle further comprises a chopper circuit comprising a first switching element capable of conducting or blocking a current in a direction from the direct-current voltage source to a grounding point of the direct-current voltage source and a second diode element capable of conducting a current only in the opposite direction to the first switching element, the first switching element and the second diode element being connected in series with each other, a positive terminal of the power storage device is connected to a point of connection of the first switching element and the second diode element and to the grounding point of the direct-current voltage source, a negative terminal of the power storage device is connected to a negative side of the inverter device, and thereby the power storage device is connected to the inverter device in such a manner that the power storage device is capable of being connected in series with the inverter device, and a switching operation of the first switching element occurs in a state where the power storage device is connected in series with the inverter device.

2. The drive device for a railway vehicle according to claim 1, wherein the drive device further comprises a first reactor connected between a point of connection of the first switching element and the second diode element and the positive terminal of the power storage device, and the chopper circuit comprises the first switching element, a first diode element that is connected in parallel with the first switching element and is capable of conducting a current only in the opposite direction to the first switching element, and a second switching element that is connected in parallel with the second diode element and is capable of conducting or blocking a current in the opposite direction to the second diode element.

3. The drive device for a railway vehicle according to claim 2, wherein the drive device further comprises first current controlling circuit disposed between a positive side of the power storage device and a grounding point of the direct-current voltage source.

4. The drive device for a railway vehicle according to claim 3, wherein the drive device comprises fifth current controlling circuit and sixth current controlling circuit connected in series with each other between the positive side and the negative side of the power storage device, and a second reactor connected in series with the first current controlling circuit between a point of connection of the fifth current controlling circuit and the sixth current controlling circuit and the grounding point of the direct-current voltage source.

5. The drive device for a railway vehicle according to claim 3, wherein the drive device further comprises fifth current controlling circuit and sixth current controlling circuit connected in series with each other between a positive side and a negative side of the power storage device, and comprising a second reactor connected between a point of connection of the fifth current controlling circuit and the sixth current controlling circuit and the negative side of the inverter device.

6. The drive device for a railway vehicle according to claim 3, wherein the first current controlling circuit and the second current controlling circuit are current blocking switch formed by a mechanical contact.

7. The drive device for a railway vehicle according to claim 6, wherein, in power running, the second current controlling circuit is made conductive, and the power storage device and the inverter device are connected in parallel with each other.

8. The drive device for a railway vehicle according to claim 6, wherein, in power running, the power storage device is capable of being discharged by inserting the power storage device in parallel with the inverter device or inserting the power storage device in series with the inverter device.

9. The drive device for a railway vehicle according to claim 3, wherein the first current controlling circuit comprises current blocking switch formed by a semiconductor element capable of conducting or blocking a current in a direction from the grounding point of the direct-current voltage source to the positive side of the power storage device and diode element capable of conducting a current only in the opposite direction to the current blocking switch, the current blocking switch and the diode element being connected in parallel with each other, and the second current controlling circuit comprises current blocking switch formed by a semiconductor element capable of conducting or blocking a current in a direction from the grounding point of the direct-current voltage source to the negative side of the power storage device and diode element capable of conducting a current only in the opposite direction to the current blocking switch, the current blocking switch and the diode element being connected in parallel with each other.

10. The drive device for a railway vehicle according to claim 3, wherein the first current controlling circuit is diode element formed by a semiconductor element capable of conducting a current only in a direction from the grounding point of the direct-current voltage source to the positive side of the power storage device, and the second current controlling circuit is current blocking switch formed by a mechanical contact.

11. The drive device for a railway vehicle according to claim 3, wherein the first current controlling circuit is diode element formed by a semiconductor element capable of conducting a current only in a direction from the grounding point of the direct-current voltage source to the positive side of the power storage device, and the second current controlling circuit comprises current blocking switch formed by a semiconductor element capable of conducting or blocking a current in a direction from the grounding point of the direct-current voltage source to the negative side of the power storage device and diode element capable of conducting a current only in the opposite direction to the current blocking switch, the current blocking switch and the diode element being connected in parallel with each other.

12. The drive device for a railway vehicle according to claim 3, wherein, in regenerative braking, the drive device is capable of providing at the same time a high speed range electric brake function of increasing a regenerative braking force by supplying a sum of the direct-current voltage source voltage and a terminal-to-terminal voltage of the power storage device to the inverter device as an input voltage by causing a switching operation of the first switching element while keeping the power storage device inserted in series with the inverter device and a regenerative energy absorption function of making the power storage device absorb a regenerated power having failed to be fed back to the direct-current voltage source.

13. The drive device for a railway vehicle according to claim 1, wherein in a regenerative (braking) operation, the power storage device is charged with a regenerated power by causing a switching operation of the first switching element.

14. The drive device for a railway vehicle according to claim 1, further comprising an operation mode determining part that determines an operation mode based on any of a state of charge of the power storage device, the direct-current voltage source voltage and a speed, information from a database that stores a traffic density and an operation pattern, and a position and a traveling time of the vehicle.

15. The drive device for a railway vehicle according to claim 14, wherein the operation mode is determined based on the direct-current voltage source voltage and the speed.

16. The drive device for a railway vehicle according to claim 15, wherein the drive device permits an operation of a high speed range electric brake function or a regenerative energy absorption function if a state of charge of the power storage device is equal to or lower than an upper limit of charging and stops the operation of the high speed range electric brake function or the regenerative energy absorption function if the state of charge of the power storage device exceeds the upper limit of charging.

17. The drive device for a railway vehicle according to claim 14, further comprising the database that stores the traffic density and the operation pattern, wherein the operation mode for the position or the traveling time of the vehicle is determined in advance based on the information from the database.

18. The drive device for a railway vehicle according to claim 14, further comprising the database that stores the traffic density and the operation pattern, wherein the operation mode for the position or the traveling time of the vehicle is determined in advance based on the information from the database and is also determined based on the direct-current voltage source voltage and the speed, the operation mode determined in advance based on the information from the database and the operation mode determined based on the direct-current voltage source voltage and the speed are compared with each other, and the operation mode determined based on the direct-current voltage source voltage and the speed is selected in preference to the operation mode determined based on the information from the database if the operation modes differ from each other.

* * * * *